(12) United States Patent
Srinivasan et al.

(10) Patent No.: US 9,465,999 B2
(45) Date of Patent: Oct. 11, 2016

(54) METHODS AND APPARATUS TO COUNT PEOPLE IN IMAGES

(71) Applicant: The Nielsen Company (US), LLC, Schaumburg, IL (US)

(72) Inventors: Venugopal Srinivasan, Tarpon Springs, FL (US); Padmanabhan Soundararajan, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/281,104

(22) Filed: May 19, 2014

(65) Prior Publication Data

US 2014/0254876 A1 Sep. 11, 2014

Related U.S. Application Data

(63) Continuation of application No. 13/434,319, filed on Mar. 29, 2012, now Pat. No. 8,761,442.

(51) Int. Cl.
G06K 9/00 (2006.01)

(52) U.S. Cl.
CPC ....... *G06K 9/00778* (2013.01); *G06K 9/00295* (2013.01)

(58) Field of Classification Search
None
See application file for complete search history.

(56) References Cited

U.S. PATENT DOCUMENTS

| | | |
|---|---|---|
| 5,012,522 A | 4/1991 | Lambert |
| 5,121,201 A | 6/1992 | Seki |
| 5,298,697 A | 3/1994 | Suzuki et al. |
| 5,581,625 A | 12/1996 | Connell |
| 6,108,437 A | 8/2000 | Lin |
| 6,137,498 A | 10/2000 | Silvers |
| 6,661,918 B1 | 12/2003 | Gordon et al. |
| 6,931,146 B2 | 8/2005 | Aoki et al. |
| 6,985,623 B2 | 1/2006 | Prakash et al. |
| 7,133,537 B1 | 11/2006 | Reid |
| 7,366,330 B2 | 4/2008 | Ito |
| 7,460,695 B2 | 12/2008 | Steinberg et al. |
| 7,612,796 B2 | 11/2009 | Lev-Ran et al. |
| 7,636,456 B2 | 12/2009 | Collins et al. |
| 7,643,658 B2 | 1/2010 | Kilner et al. |
| 8,085,995 B2 | 12/2011 | Yagnik |

(Continued)

OTHER PUBLICATIONS

United States Patent and Trademark Office, "Notice of Allowance," issued in connection with Application No. 13/434,337, Mar. 11, 2015, 46 pages.

(Continued)

*Primary Examiner* — Jon Chang
(74) *Attorney, Agent, or Firm* — Hanley, Flight & Zimmerman, LLC

(57) ABSTRACT

Methods and apparatus to count people in images are disclosed. An example method includes maintaining a history of instances in which a person is detected by a first image sensor and by a second sensor different than the first image sensor at approximately a same time, respective ones of the instances including a first coordinate at which a first person was detected via the first image sensor, and a second coordinate at which the first person was detected via the second image sensor; and, in response to first image data captured by the first image sensor including a second person at the first coordinate, determining whether second image data captured by the second image sensor includes the second person without comparing the first image data to the second image data.

17 Claims, 18 Drawing Sheets

(56) References Cited

U.S. PATENT DOCUMENTS

| | | | |
|---|---|---|---|
| 8,369,622 | B1 | 2/2013 | Hsu et al. |
| 8,660,307 | B2 | 2/2014 | Srinivasan et al. |
| 8,761,442 | B2 | 6/2014 | Srinivasan et al. |
| 2003/0025794 | A1 | 2/2003 | Fujii |
| 2003/0103647 | A1 | 6/2003 | Rui et al. |
| 2004/0109592 | A1 | 6/2004 | Bankman et al. |
| 2004/0156535 | A1 | 8/2004 | Goldberg et al. |
| 2005/0248654 | A1 | 11/2005 | Tsujino et al. |
| 2006/0120564 | A1* | 6/2006 | Imagawa et al. ............. 382/103 |
| 2006/0120572 | A1 | 6/2006 | Li et al. |
| 2006/0147113 | A1 | 7/2006 | Han |
| 2007/0071329 | A1 | 3/2007 | Terakawa |
| 2009/0060277 | A1 | 3/2009 | Zhang et al. |
| 2009/0161912 | A1 | 6/2009 | Yatom et al. |
| 2009/0217315 | A1 | 8/2009 | Malik et al. |
| 2010/0053419 | A1 | 3/2010 | Fukui |
| 2010/0157089 | A1 | 6/2010 | Pakulski et al. |
| 2010/0162285 | A1 | 6/2010 | Cohen et al. |
| 2011/0216940 | A1* | 9/2011 | Morioka ................... G06T 7/20 382/103 |
| 2012/0008826 | A1 | 1/2012 | Mishra et al. |
| 2012/0026335 | A1* | 2/2012 | Brown ...................... G01S 5/16 348/159 |
| 2012/0027299 | A1 | 2/2012 | Ran |
| 2012/0033875 | A1 | 2/2012 | Bergman et al. |
| 2013/0051677 | A1 | 2/2013 | Lee |
| 2013/0156299 | A1 | 6/2013 | Zhang et al. |
| 2013/0259380 | A1 | 10/2013 | Srinivasan et al. |
| 2013/0259381 | A1 | 10/2013 | Srinivasan et al. |
| 2014/0105461 | A1 | 4/2014 | Srinivasan et al. |
| 2014/0152763 | A1 | 6/2014 | Lim et al. |
| 2015/0269443 | A1 | 9/2015 | Srinivasan et al. |

OTHER PUBLICATIONS

Krahnstoever et al. "Multi-Camera Person Tracking in Crowded Environments." 12th IEEE International Workshop on Performance Evaluation of Tracking and Surveillance, Dec. 2009, pp. 1-7.

Kettnaker et al. "Counting People from Multiple Cameras." IEEE International Conference on Multimedia Computing and Systems, vol. 2, Jul. 1999, pp. 267-271.

United States Patent and Trademark Office, "Final Office Action," issued in connection with U.S. Appl. No. 13/434,337, Feb. 28, 2014, 53 pages.

United States Patent and Trademark Office, "Non-final Office Action," issued in connection with U.S. Appl. No. 13/434,330, Mar. 6, 2014, 46 pages.

Beymer, "Person Counting Using Stereo," 2000, 7 pages, SRI International, Menlo Park, CA.

United States Patent and Trademark Office, "Notice of Allowance and Fee(s) Due," issued in connection with U.S. Appl. No. 13/434,302, Oct. 9, 2013, 50 pages.

United States Patent and Trademark Office, "Non-Final Office Action," issued in connection with U.S. Appl. No. 13/434,337, Oct. 23, 2013, 16 pages.

United States Patent and Trademark Office, "Non-Final Office Action," issued in connection with U.S. Appl. No. 13/434,319, Oct. 8, 2013, 39 pages.

United States Patent and Trademark Office, "Notice of Allowance and Fee(s) Due," issued in connection with U.S. Appl. No. 13/434,319, Feb. 14, 2014, 19 pages.

United States Patent and Trademark Office, "Non-Final Office Action," issued in connection with U.S. Appl. No. 14/136,748, Jun. 18, 2015, 46 pages.

United States Patent and Trademark Office, "Non-Final Office Action," issued in connection with U.S. Appl. No. 13/434,337, Jul. 3, 2014, 56 pages.

United States Patent and Trademark Office, "Final Office Action," issued in connection with U.S. Appl. No. 13/434,330, Dec. 5, 2014, 27 pages.

United States Patent and Trademark Office, "Notice of Allowance," issued in connection with U.S. Appl. No. 13/434,330, Oct. 13, 2015, 61 pages.

United States Patent and Trademark Office, "Notice of Allowance," issued in connection with U.S. Appl. No. 14/136,748, Nov. 25, 2015, 29 pages.

* cited by examiner

METHODS AND APPARATUS TO COUNT PEOPLE IN IMAGES

RELATED APPLICATIONS

This patent arises from a continuation of U.S. patent application Ser. No. 13/434,319, filed Mar. 29, 2012, which is hereby incorporated by reference herein in its entirety.

This patent is related to U.S. patent application Ser. No. 13/434,330, filed on Mar. 29, 2012. This patent is related to U.S. patent application Ser. No. 13/434,302, filed on Mar. 29, 2012. This patent is related to U.S. patent application Ser. No. 13/434,337, filed on Mar. 29, 2012. This patent is related to U.S. patent application Ser. No. 14/136,748, filed on Dec. 20, 2013. Each of U.S. patent application Ser. Nos. 13/434,330, 13/434,302, 13/434,337, and 14/136,748 is incorporated herein by reference in its entirety.

FIELD OF THE DISCLOSURE

This disclosure relates generally for audience measurement and, more particularly, to methods and apparatus to count people in images.

BACKGROUND

Audience measurement of media (e.g., content and/or advertisements, such as broadcast television and/or radio programs and/or advertisements, stored audio and/or video programs and/or advertisements played back from a memory such as a digital video recorder or a digital video disc, audio and/or video programs and/or advertisements played via the Internet, video games, etc.) often involves collection of media identifying data (e.g., signature(s), fingerprint(s), embedded code(s), channel information, time of presentation information, etc.) and people data (e.g., user identifiers, demographic data associated with audience members, etc.). The media identifying data and the people data can be combined to generate, for example, media exposure data indicative of amount(s) and/or type(s) of people that were exposed to specific piece(s) of media.

In some audience measurement systems, the collected people data includes an amount of people in a media exposure environment (e.g., a television room, a family room, a living room, a cafeteria at a place of business or lounge, a television viewing section of a store, restaurant, a bar, etc.). To calculate the amount of people in the environment, some measurement systems capture image(s) of the environment and analyze the image(s) to determine how many people appear in the image(s) at a particular date and time. The calculated amount of people in the environment can be correlated with media being presented in the environment at the particular date and time to provide exposure data (e.g., ratings data) for that media.

DETAILED DESCRIPTION

Figure 1:
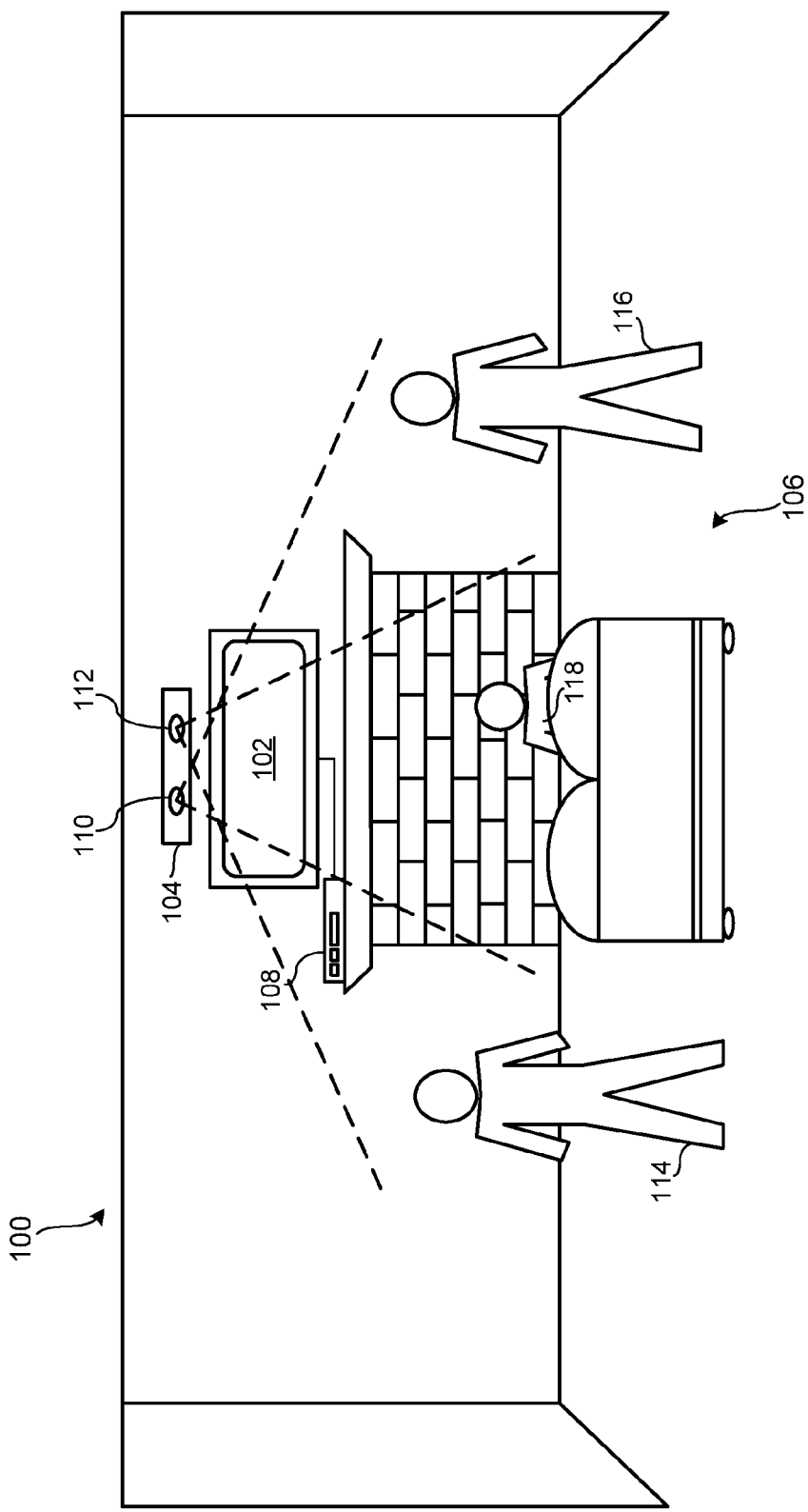
FIG. 1 is an illustration of an example media exposure environment including an example audience measurement device disclosed herein.

A plurality of applications, systems, and devices (e.g., surveillance systems, consumer behavior monitors deployed in shopping centers, audience measurement devices, etc.) benefit from an ability to accurately count a number of people in a particular space or environment at a particular time. Such systems typically capture images of the monitored environment and analyze the images to determine how many people are present at certain times. While example methods, apparatus, and articles of manufacture disclosed herein to count people in images are described below in connection with a media exposure environment, examples disclosed herein can be employed in additional and/or alternative contexts, environments, applications, devices, systems, etc. that count people in images.

To count people in a media exposure environment, some audience measurement systems attempt to recognize objects as humans in image data representative of the media exposure environment. In traditional systems, the audience measurement system maintains a tally for each frame of image data to reflect an amount of people in the environment at a time corresponding to a respective frame. Recognition of an object as a human in a frame of image data causes the traditional audience measurement devices to increment the tally associated with that frame. However, faces of people often are undetected or unrecognized due to, for example, partial visibility, lighting conditions, obscuring of the face due to eating or drinking, or a rotation of a head relative to a camera capturing the frames, etc. Additionally, faces of people in the media exposure environment may go undetected or unrecognized due to field of view limitations associated with an image sensor. In other words, the image sensor tasked with captured images of the media exposure environment may not have a wide enough field of view to capture certain faces of people that are being exposed to media. Additionally, a non-human object, such as a picture of a human face hanging on a wall, is sometimes mistaken for a human face, thereby improperly inflating the tally for the corresponding frame. An identification of a non-human object as a face is referred to herein as a false positive.

These and other limitations and/or inaccuracies can lead to an inaccurate tally of people for individual frames. An inaccurate tally of people in a frame can negatively affect the accuracy of media exposure data generated using the tally. For example, an audience measurement system counting the people in a room may also be collecting media identifying information to identify media being presented (e.g., aurally and/or visually) in the room. With the identification of the media and the amount of people in the room at a given date and time, the audience measurement system can indicate how many people were exposed to the specific media and/or associate the demographics of the people to determine audience characteristics for the specific media. When face(s) are not detected or recognized as faces, the exposure data for the identified media may be undercut (e.g., the media is accredited with less viewers/listeners than had actually been exposed to the media). Alternatively, when false positives are detected, the exposure data for the identified media may be overstated (e.g., the media is accredited with more viewers/listeners than had actually been exposed to the media).

Example methods, apparatus, and articles of manufacture disclosed herein increase the accuracy of people tallies or counts by analyzing images captured over a period of time. To compensate for limitations of facial detection abilities on a frame-by-frame basis (e.g., a face that is properly identified as a face in a first frame may not be identified as a face in a second frame despite the actual presence of the face in the second frame), examples disclosed herein analyze a plurality of frames captured over a period of time (e.g., one minute) to generate a people tally for that period of time. That is, rather than generating people tallies for each individual frame, examples disclosed herein generate a people tally for a time interval as a whole. However, analyzing images taken over a period of time as a whole creates challenges for accurately counting the people appearing in the images. For example, a person may move during the period of time and, as a result, has the potential to be counted twice for the period of time. Example methods, apparatus, and articles of manufacture disclosed herein address challenges presented by analyzing images taken over a period of time as a whole. As described in detail below, examples disclosed herein group together face detections using a grouping algorithm and eliminate transient detections that should not be included in the corresponding people tally.

Further, example methods, apparatus, articles of manufacture disclosed herein condition individual frames of a period of time before the face detections are grouped together and counted for the period of time. For example, methods, apparatus, and articles of manufacture disclosed herein eliminate static false positives from the individual images using one or more example techniques disclosed herein. As described in detail below, examples disclosed herein analyze fluctuation factors (e.g., root mean square values) of the individual images to identify and eliminate static false positives. Additionally or alternatively, examples disclosed herein correlate face detections of a current frame to successful face detections of previous frames to identify and eliminate static false positives. The elimination of false positives from the individual frames increases the accuracy of facial identification for the individual frames. In turn, the example grouping analysis disclosed herein is provided with conditioned, more accurate face detection data. Because the example grouping analysis disclosed herein is based on more accurate face detection data, the corresponding people tally for each period of time is more accurate.

Further, example methods, apparatus, and articles of manufacture disclosed herein increase accuracy of people counts or tallies generated via processing image data captured by multiple image sensors. To increase field of view capabilities and, thus, the likelihood that each person located in a monitored environment is detected and counted, examples disclosed herein utilize multiple images sensors to simultaneously capture multiple images of the environment for a particular time. However, the use of multiple image sensors creates challenges for accurately counting the people appearing in the images. For example, when the fields of view of the individual image sensors intersect to form an overlap region, a person located in the overlap region has the potential to be counted twice when detected by both cameras. As described in detail below, examples disclosed herein determine whether an overlap detection has occurred in connection with individual frames captured over a period of time and, if so, eliminate the corresponding face detections for the individual frames. Additionally, when examples disclosed herein group together face detections for the period of time using the individual frames, examples disclosed herein also eliminate redundant ones of the groups that fall in the overlap region. Thus, examples disclosed herein eliminate redundant face detections in individual frames collected over a period of time, as well as redundant face detection groups formed from for the period of time using the individual frames. As described in detail below, the multiple eliminations of overlapping face detections provided by examples disclosed herein increase the accuracy of people tallies generated for periods of time using multiple image sensors.

Further, example methods, apparatus, and articles of manufacture disclosed herein enable image sensors that provide image data to face detection logic to capture frames at an increased rate by identifying active segments of frames of image data and limiting the face detection logic to the active segments. As described in detail below, examples disclosed herein divide frames into segments and analyze each segment to determine whether one or more factors indicate a presence of a person. In some instances, examples disclosed herein compare a fluctuation factor of each segment to an average fluctuation factor associated with the frame. Because image data representative of human beings tends to fluctuate more than image data representative of static objects, the segments having greater than average fluctuation factors are identified as active segments. Further, examples disclosed herein link adjacent active segments to form regions of interest. In some examples, face detection logic is executed only on the regions of interest, thereby reducing the computational load associated with the face detection logic. The reduced computational load enables an increased frame rate for the image sensors. By increasing the frame rate, examples disclosed herein increase opportunities to detect faces, reduce false positives, and provide faster computational capabilities.

FIG. 1 is an illustration of an example media exposure environment 100 including a media presentation device 102 and an example audience measurement device 104 for measuring an audience 106 of the media presentation device 102. In the illustrated example of FIG. 1, the media exposure environment 100 is a room of a household that has been statistically selected to develop television ratings data for population(s)/demographic(s) of interest. The example audience measurement device 104 can be implemented in additional and/or alternative types of environments such as, for example, a room in a non-statistically selected household, a theater, a restaurant, a tavern, a retail location, an arena, etc. In the illustrated example of FIG. 1, the media presentation device is a television 102 coupled to a set-top box (STB) 108 (e.g., a cable television tuning box, a satellite tuning box, etc.). The STB 108 may implement a digital video recorder (DVR). A digital versatile disc (DVD) player may additionally or alternatively be present. The example audience measurement device 104 can be implemented in connection with additional and/or alternative types of media presentation devices such as, for example, a radio, a computer, a tablet, a cellular telephone, and/or any other communication device able to present media to one or more individuals.

The example audience measurement device 104 of FIG. 1 utilizes first and second image sensors 110 and 112 to capture a plurality of frame pairs of image data of the environment 100. The first image sensor 110 captures a first image within a first field of view and the second image sensor 112 simultaneously (e.g., within a margin of error) captures a second image within a second field of view. The first and second images are linked (e.g., by a tag or by common timestamp) to form a frame pair corresponding to a time at which the frames were captured. The fields of view of the image sensors 110, 112 are shown in FIG. 1 with dotted lines. While shown in a cross-eyed arrangement in FIG. 1, the first and second image sensors 110 and 112 can be arranged in any suitable manner. Further, the example audience measurement device 104 can include more than two image sensors. Further, the example audience measurement device 104 can receive (e.g., via wired or wireless communication) data from image sensors located outside of the audience measurement device 104, such as an image sensor located along the wall on which the audience measurement device 104 is implemented or elsewhere in the media exposure environment 100. In some examples, the audience measurement device 104 is implemented by the Microsoft Kinect® sensor.

In the example shown in FIG. 1, the audience 106 includes three people and, thus, an accurate people tally for the environment 100 shown in FIG. 1 will equal three. As described in detail below, the example audience measurement device 104 of FIG. 1 also monitors the environment 100 to identify media being presented (e.g., displayed, played, etc.) by the television 102 and/or other media presentation devices to which the audience 106 is exposed. Identifying information associated with media to which the audience 106 is exposed is correlated with the people tallies to generate exposure data for the presented media. Therefore, the accuracy of the media exposure data depends on the ability of the audience measurement device 104 to accurately identify the amount of people in the audience 106 as three.

Figure 2:
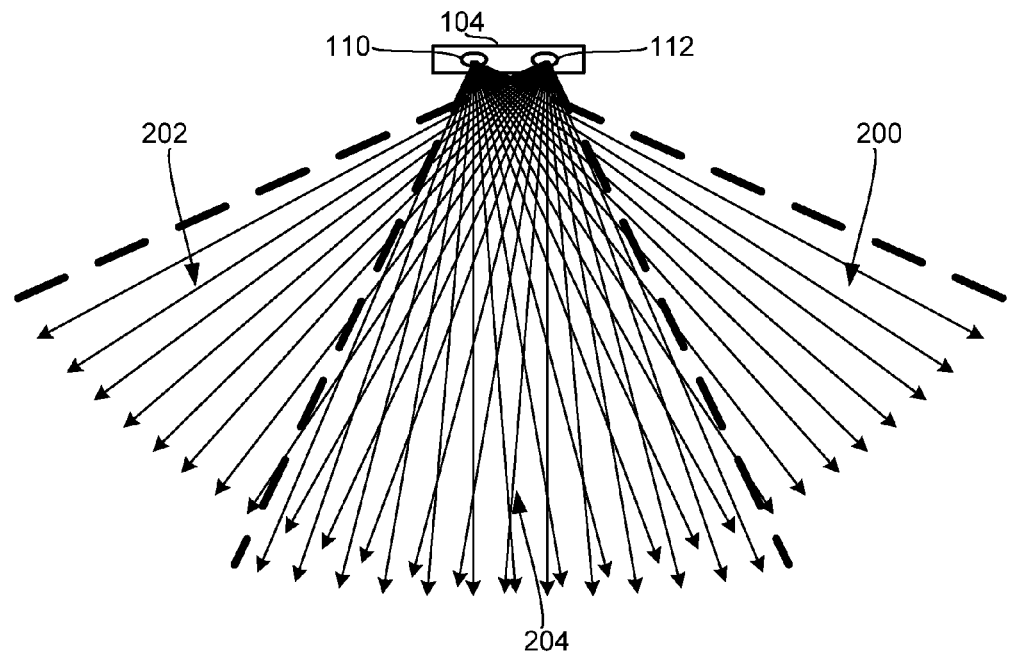
FIG. 2 is an illustration of an example overlap region associated with the first and second image sensors of FIG. 1.

FIG. 2 shows intersections of the fields of view of the first and second image sensors 110 and 112 of the example audience measurement device 104 of FIG. 1. Patterns of the example fields of view shown in FIG. 2 may vary depending on, for example, capabilities (e.g., depth of capture ranges) of the image sensors 110 and 112 and/or the arrangement of the image sensors 110 and 112. A first region including the field of view of the first image sensor 110 is labeled with reference numeral 200 in FIG. 2. A second region including the field of view of the second image sensor 112 is labeled with reference numeral 202 in FIG. 2. An overlap region in which the first region 200 and the second region 202 intersect is labeled with reference numeral 204 in FIG. 2. As described in detail below, a person detected in the overlap region 204 is susceptible to being double counted and, thus, causing incorrect people tallies. In the illustrated example of FIG. 1, a first person 114 falls in the first region 200, a second person 116 falls in the second region 202, and a third person 118 falls in the overlap region 204. Because the third person 118 may be counted in connection with both the first image sensor 110 and the second image sensor 112, the audience 106 has the potential to be incorrectly identified as including four people. As described below, examples disclosed herein enable the audience measurement device 104 to identify the third person 118 as located in the overlap region 204 and, thus, capable of being redundantly counted. Furthermore, examples disclosed herein enable the audience measurement device 104 to disqualify a redundant detection of the third person 118 from inclusion in a people tally to ensure the tally is accurate.

Figure 3:
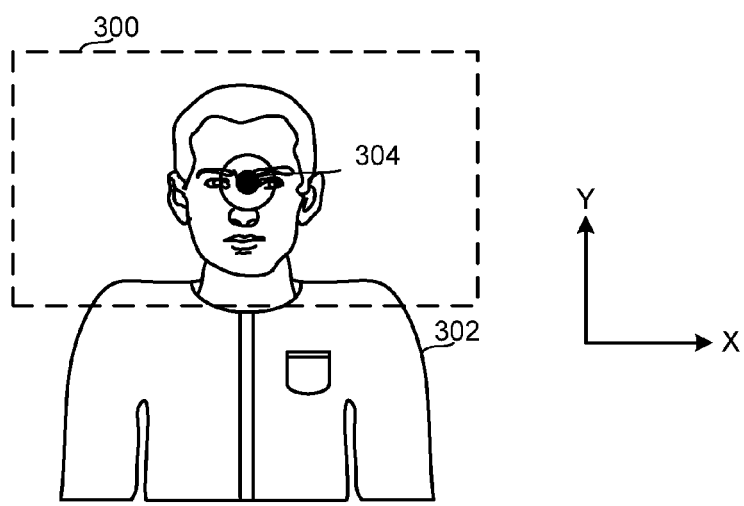
FIG. 3 is an illustration of an example face rectangle detected by the example audience measurement device of FIG. 1.

The example audience measurement device 104 detects faces in the regions 200-204 and generates people tallies based on the face detections. In the illustrated example, the audience measurement device 104 detects an object having characteristics of a human face and assigns a rectangle (or any other shape, such as a square, an oval, a circle, etc.) to that object. While the frame can be any suitable shape, the assigned frame is referred to herein as a face rectangle. FIG. 3 illustrates an example face rectangle 300 assigned to a face of a person 302 detected in one of the regions 200-204 of FIG. 2. In the illustrated example, the audience measurement device 104 generates the face rectangle around the detected face to demarcate a position in the image data at which the face is located. The example face rectangle 300 of FIG. 3 is centered on a point 304 at a center of the detected face. The size of the example face rectangle 300 of FIG. 3 ranges between 32×32 pixels and 100×100 pixels depending on adjustable settings of the audience measurement device 104. The example audience measurement device 104 also records a position of the detected face. In the illustrated example of FIG. 3, the recorded position 304 is defined by X-Y coordinates at a center of the face box 300 (e.g., the point 304 of FIG. 3) surrounding the face. The X-Y coordinates corresponds to a two-dimensional grid overlaid on the first frame.

Figure 4:
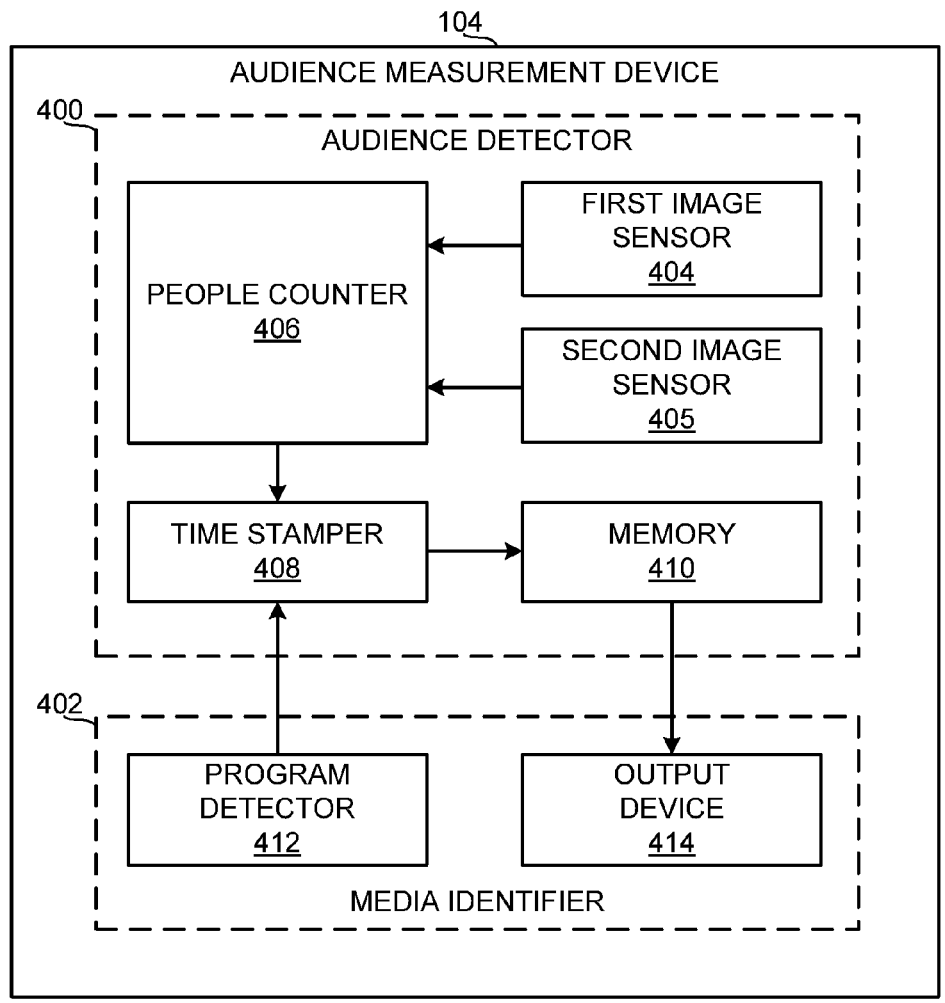
FIG. 4 is a block diagram of an example implementation of the example audience measurement device of FIGS. 1 and/or 2.

FIG. 4 is a block diagram of an example implementation of the example audience measurement device 104 of FIG. 1. The example audience measurement device 104 of FIG. 4 includes an audience detector 400 and a media identifier 402. The example audience detector 400 of FIG. 4 includes a first image sensor 404 and a second sensor 405 that respectively correspond to the first and second image sensors 110 and 112 of FIGS. 1 and 2. The example audience detector 400 of FIG. 4 also includes a people counter 406, a time stamper 408, and a memory 410. The example image sensors 404 and 405 of FIG. 2 capture frame pairs of image data of the environment 100, which includes the audience 106 being exposed to a presentation output by the media presentation device 102 of FIG. 1. In some examples, the image sensors 404 and 405 only capture frames of image data when the media presentation device 102 is in an "on" state and/or when the media identifier 402 determines that media is being presented in the environment 100 of FIG. 1. The image sensors 404 and 405 may be implemented as any suitable device such as, for example, an infrared imager or a digital camera, such as a charge-coupled device (CCD) camera. In the illustrated example, the image sensors 404 and 405 are implemented by cameras operating at a native resolution of 1600×1200. In some instances, image data captured by the image sensors 404 and 405 is reduced to 1200×900 for processing to reduce computational load. To enable the image sensors 404 and 405 to operate under a wide range of lighting conditions (e.g., ranging from sunlight to darkness), infrared (IR) light filter(s) are removed from the cameras 404 and 405 such that IR light can be detected.

The frame pairs obtained by the image sensors 404 and 405 of FIG. 4 are conveyed to the people counter 406. In the illustrated example of FIG. 4, the people counter 406 determines and records how many people are present in the media exposure environment 100 of FIG. 1 for a particular period of time (e.g., a minute) using the received frame pairs. The manner in which the example people counter 406 of FIG. 4 performs its operations is described in detail below in connection with FIGS. 5-19.

The example people counter 406 of FIG. 4 outputs calculated people tallies along with the corresponding frames to the time stamper 408. The time stamper 408 of the illustrated example includes a clock and a calendar. The example time stamper 408 associates a time period (e.g., 1:00 a.m. Central Standard Time (CST) to 1:01 a.m. CST) and date (e.g., Jan. 1, 2012) with each calculated tally by, for example, appending the period of time and date information to an end of the tally data. In some examples, the timestamper 408 applies a time and date, rather than a time of period. A data package (e.g., the tally, the timestamp, and the image data) is stored in the memory 410. The memory 410 may include a volatile memory (e.g., Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The memory 410 may also include one or more mass storage devices such as, for example, hard drive disk(s), compact disk drive(s), digital versatile disk drive(s), etc.

The example media identifier 402 of FIG. 4 includes a program detector 412 and an output device 414. The example program detector 412 of FIG. 4 detects presentation (s) of media in the media exposure environment 100 and collects identification information associated with the detected presentation(s). For example, the program detector 412, which may be in wired and/or wireless communication with the presentation device 102 and/or the STB 108 of FIG. 1, can identify a presentation time and a source (e.g., a tuned channel) of a presentation. The presentation time and the source identification data may be utilized to identify the program by, for example, cross-referencing a program guide configured, for example, as a look up table. The source identification data may, for example, be the identity of a channel obtained, for example, by monitoring a tuner of the STB 108 or a digital selection (e.g., a remote control signal) of a channel to be presented on the television 102. Additionally or alternatively, codes embedded with or otherwise broadcast with media being presented via the STB 108 and/or the television 102 may be utilized by the program detector 412 to identify the presentation. As used herein, a code is an identifier that is transmitted with the media for the purpose of identifying and/or tuning the corresponding media (e.g., an audience measurement code, a PIU used for tuning, etc.). Codes may be carried in the audio, in the video, in the metadata, in the vertical blanking interval, or in any other portion of the media. Additionally or alternatively, the program detector 412 can collect a signature representative of a portion of the media. As used herein, a signature is a representation of some characteristic of the media (e.g., a frequency spectrum of an audio signal). Collected signature (s) can be compared against a collection of signatures of known media to identify the corresponding media. The signature(s) can be collected by the program detector 412 and/or the program detector 412 can collect samples of the media and export them to a remote site for generation of the signature(s). Irrespective of the manner in which the media of the presentation is identified, the identification information is time stamped by the time stamper 408 and stored in the memory 410.

In the illustrated example of FIG. 4, the output device 414 periodically and/or aperiodically exports the recorded data from the memory 414 to a data collection facility via a network (e.g., a local-area network, a wide-area network, a metropolitan-area network, the Internet, a digital subscriber line (DSL) network, a cable network, a power line network, a wireless communication network, a wireless mobile phone network, a Wi-Fi network, etc.). The data collection facility utilizes the people data generated by the audience detector 400 and the media identifying data collected by the media identifier 402 to generate exposure information. Alternatively, the data analysis could be performed locally and exported via a network or the like to a data collection facility for further processing. For example, the amount of people (as counted by the people counter 406) in the exposure environment 100 for a period of time (as indicated by the time stamp appended to the people tally by the time stamper 408) in which a sporting event (as identified by the program detector 412) was presented by the television 102 can be used in a rating calculation for the sporting event. In some examples, additional information (e.g., demographic data, geographic data, etc.) is correlated with the exposure information at the data collection facility to expand the usefulness of the raw data collected by the example audience measurement device 104 of FIGS. 1 and/or 4. The data collection facility of the illustrated example compiles data from many exposure environments.

While an example manner of implementing the audience measurement device 104 of FIG. 1 has been illustrated in FIG. 4, one or more of the elements, processes and/or devices illustrated in FIG. 4 may be combined, divided, re-arranged, omitted, eliminated and/or implemented in any other way. Further, the example audience detector 400, the example media identifier 402, the first example image sensor 404, the second example image sensor 405, the example people counter 406, the example time stamper 408, the example program detector 412, the example output device 414, and/or, more generally, the example audience measurement 104 of FIG. 4 may be implemented by hardware, software, firmware and/or any combination of hardware, software and/or firmware. Thus, for example, any of the example audience detector 400, the example media identifier 402, the first example image sensor 404, the second example image sensor 405, the example people counter 406, the example time stamper 408, the example program detector 412, the example output device 414, and/or, more generally, the example audience measurement 104 of FIG. 4 could be implemented by one or more circuit(s), programmable processor(s), application specific integrated circuit(s) (ASIC (s)), programmable logic device(s) (PLD(s)) and/or field programmable logic device(s) (FPLD(s)), etc. When any of the appended system or apparatus claims of this patent are read to cover a purely software and/or firmware implementation, at least one of the example audience detector 400, the example media identifier 402, the first example image sensor 404, the second example image sensor 405, the example people counter 406, the example time stamper 408, the example program detector 412, the example output device 414, and/or, more generally, the example audience measurement 104 of FIG. 4 are hereby expressly defined to include a tangible computer readable medium such as a memory, DVD, CD, Blu-ray, etc. storing the software and/or firmware. Further still, the example audience measurement device 104 of FIG. 4 may include one or more elements, processes and/or devices in addition to, or instead of, those illustrated in FIG. 4, and/or may include more than one of any or all of the illustrated elements, processes and devices.

Figure 5:
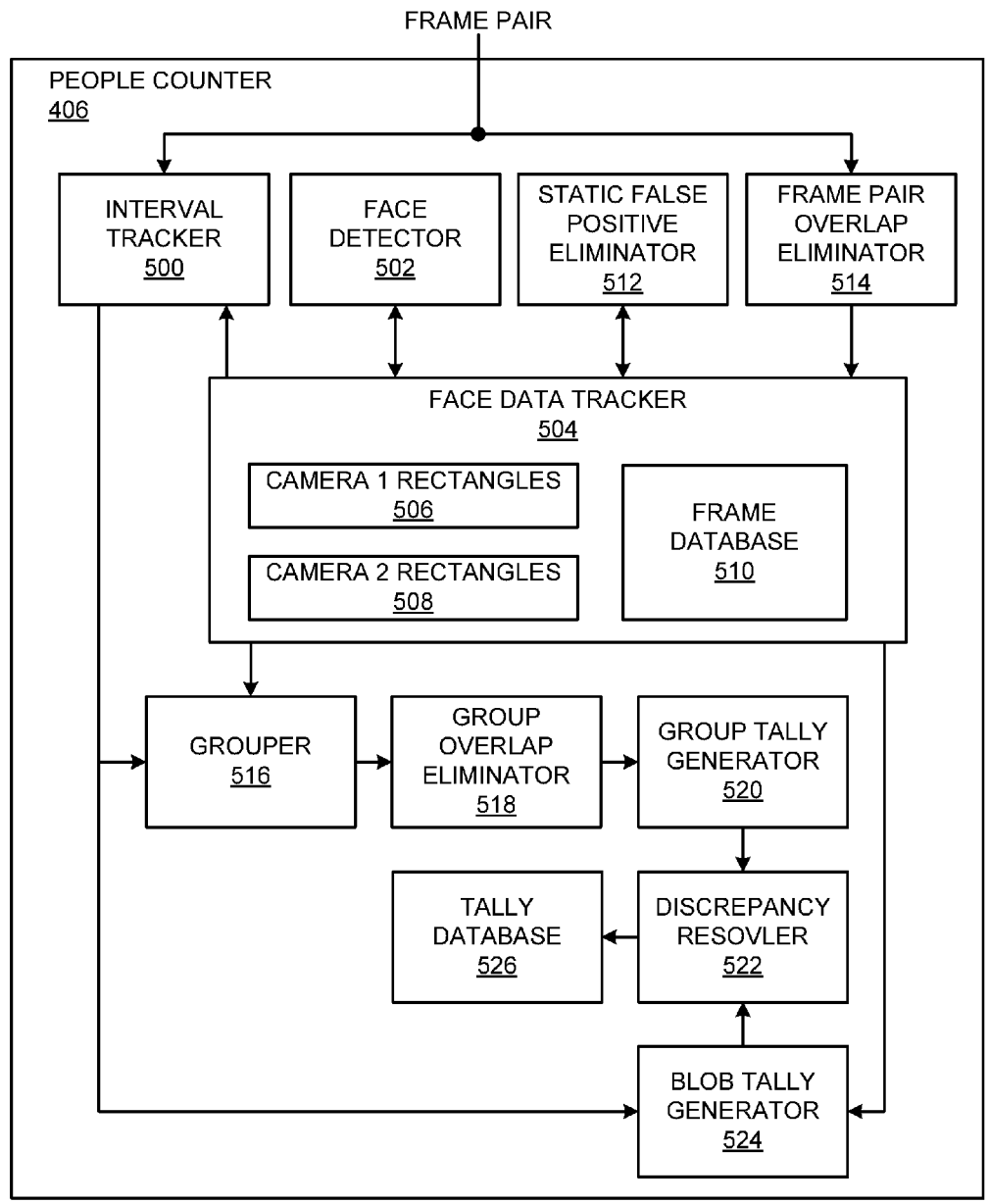
FIG. 5 is a block diagram of an example implementation of the example people counter of FIG. 4.

FIG. 5 is a block diagram of an example implementation of the example people counter 406 of FIG. 4. The example people counter 406 of FIG. 5 generates a tally representative of a number of people in the media exposure environment 100 of FIG. 1 for a period of time, such as one minute. The period of time for which the example people counter 406 generates a tally is adjustable via an interval tracker 500. The example interval tracker 500 of FIG. 5 is incremented each time a frame pair is received at the people counter 406. Because the image sensors 404 and 405 capture frame pairs at a certain rate (e.g., a frame pair every two seconds), the number of frame pairs received at the people counter 406 is translatable into a period of time (e.g., one minute). In the illustrated example, each time the example people counter 406 of FIG. 5 receives a frame pair from the image sensors 404 and 405 of FIG. 4, a value of the interval tracker 500 is incremented by one. When the value of the example interval tracker 500 has reached a threshold representative of the period of time for which a people tally is to be generated, the example interval tracker 500 triggers generation of a people count for the frame pairs that were received during the period of time. In the illustrated example, when the interval tracker 500 reaches a value of thirty, which corresponds to one minute of collecting frame pairs, a people tally is generated as described below. After triggering the generation of the people count for a period time, the example interval tracker 500 of FIG. 5 is reset to begin counting a number of received frame pairs for the next period of time.

Figure 6:
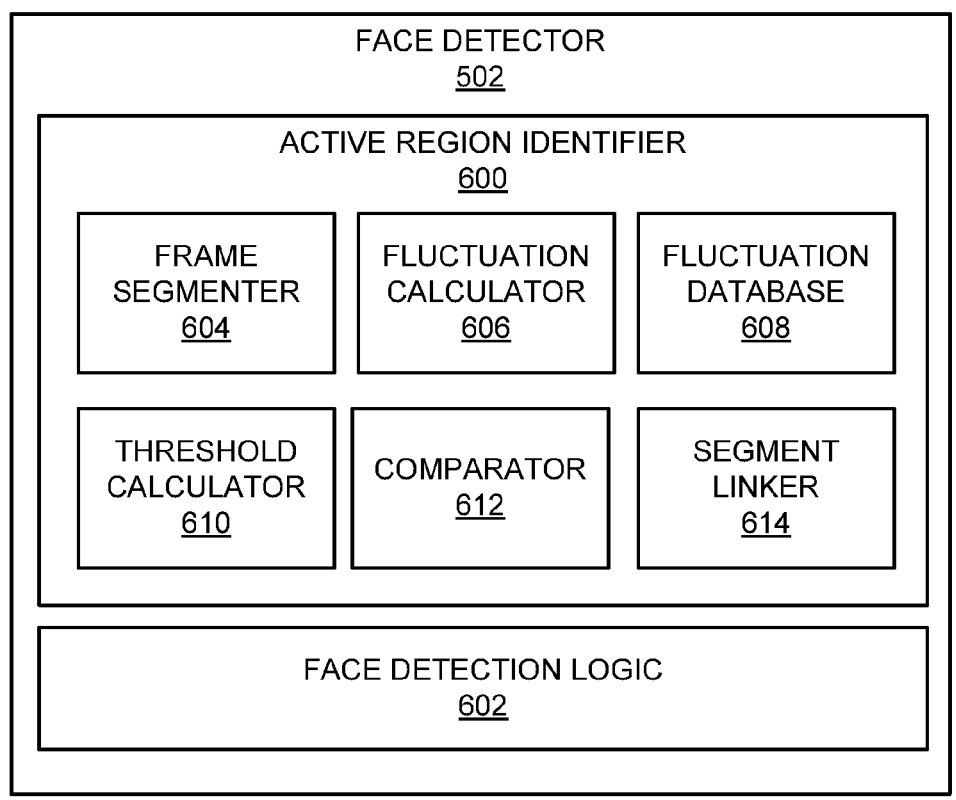
FIG. 6 is a block diagram of an example implementation of the example face detector of FIG. 5.

To identify people in the frame pairs received from the image sensors 404 and 405, the example people counter 406 of FIG. 5 includes a face detector 502. The example face detector 502 of FIG. 5 receives a first frame of image data from the first image sensor 404 and a second frame of image data from the second image sensor 405. The first and second frames of image data make up the frame pair corresponding to a first time (e.g., the first time interval, such as two seconds, of the period of time for which a people tally is generated). An example implementation of the face detector 502 is shown in FIG. 6. The example face detector 502 of FIG. 6 assigns an identifier (e.g., a tag based on a time at which the frame pair was captured) to the frame pair such that the frame pair can be identified when, for example, stored in a database and referenced by other components of the people counter 406.

The example face detector 502 includes an active region identifier 600 and face detection logic 602. The example active region identifier 600 analyzes image data of each frame of the frame pair to identify regions of interest. The regions of interest identified by the example active region identifier 600 include areas of the frame that are determined to likely include a human being rather than only static objects (e.g., walls, furniture, floors, etc.). To do so, the example active region identifier 600 of FIG. 6 includes a frame segmenter 604 that divides the frame into component parts such as, for example, 50×50 pixel rectangles. An example fluctuation calculator 606 analyzes characteristics (e.g., pixel intensities) of the segmented image data over a period of time to calculate a fluctuation factor for each of the segments. The example active region identifier 600 includes a fluctuation database 608 to track the continuously calculated fluctuation factors for the segments. Thus, for each of the segments, the example fluctuation calculator 606 calculates how much the respective image data fluctuated from one frame to the next. In the illustrated example of FIG. 6, the fluctuation calculator 606 calculates a root mean square (RMS) value for each pixel of a segment and averages the calculated RMS values for the segment to determine a collective RMS value for the segment. The collective RMS value is stored in the fluctuation database 608.

The example active region identifier 600 of FIG. 6 also includes a threshold calculator 610 to calculate an average fluctuation factor for the current frame. In the illustrated example, the threshold calculator 610 selects a random set of pixels (e.g., one thousand pixels) in the current frame and calculates an average RMS value for the random set of pixels. In the example of FIG. 6, the average RMS value for the random set of pixels is the threshold. Therefore, the threshold for the example active region identifier 600 varies over different frames. The example active region identifier 600 includes a comparator 612 to compare the RMS value of each segment to the threshold. The example comparator 612 designates segments having an RMS value greater than the threshold as active segments. Thus, the example active region identifier 600 identifies one or more segments within a frame that are active (e.g., likely to include a human).

The example active region identifier 600 of FIG. 6 includes a segment linker 614 to link active segments together to form regions of interest. In the illustrated example, when any of the active segments identified by the comparator 612 overlap or are adjacent to each other (e.g., within a margin of error), the example segment linker 614 joins the segments to form a rectangle (or any other shape) representative of a region of interest. Thus, the example active region identifier 600 generates one or more regions of interest that span each active segment likely to include a human.

In the illustration example of FIG. 6, the face detection logic 602 is executed on the regions of interest identified by the active region identifier 600. Further, in the illustrated example, the face detection logic 602 is not executed on areas of the frame outside of the regions of interest. By limiting the face detection logic 602 to the regions of interest, the example face detector 502 is able to, for example, increase a frame rate at which frames are captured. For example, because of the reduced computational load of having to analyze only a portion of each frame, the image sensors 404 and 405 of FIG. 4 can be set to capture one frame every one second instead of every two seconds. A faster capture rate leads to an increased amount of frames and, thus, an increased sample size. As a result, the likelihood of properly detecting faces over a period of time is increased.

The example face detection logic 602 of FIG. 6 analyzes the objects of the frame pair to determine whether one or more of the objects are faces via, for example, face detection techniques and/or algorithms. In the illustrated example of FIG. 6, the face detection logic is unconcerned with an identity of a person belonging to detected faces. However, in some examples, the face detection logic 602 may attempt to identify the person by, for example, comparing image data corresponding to a detected face to a collection of images known to belong to identifiable people (e.g., frequent visitors and/or members of the household associated with the room 100 of FIG. 1).

When a first face is detected in the image data, the example face detection logic 602 of FIG. 6 generates a face indication, such as a rectangle surrounding a detected face as shown in FIG. 3, to mark a position (e.g., X-Y coordinates) in the corresponding frame at which the face is located. For each detected face, the example face detection logic 602 of FIG. 6 passes information to a face data tracker 504 of FIG. 5. In the illustrated example of FIGS. 5 and 6, the information passed to the face data tracker 504 for each frame includes any generated face rectangles and corresponding coordinate(s) within the frame, the image data outlined by the face rectangle, an indication of which one of the image sensors 404 or 405 captured the frame, an indicator (e.g., the identifier assigned by the face detector 502) of the frame pair to which the face rectangle(s) belong, and a time stamp. The example face data tracker 504 of FIG. 5 includes a first set of face rectangles 506 detected in connection with the first image sensor 404 and a second set of face rectangles 508 detected in connection with the second image sensor 405. The first and second sets of face rectangles 506 and 508 store the received information related to the face rectangles detected by the face detector 502. In the illustrated example, the face detector 502 also forwards the frame pair and the corresponding image data to a frame database 510, which stores the frame pair in a searchable manner (e.g., by time stamp and/or frame pair identifier).

The example people counter 406 of FIG. 5 includes a static false positive eliminator 512 to remove face rectangles from the face rectangle sets 506 and 508 that correspond to false positives. The example static false positive eliminator 512 of FIG. 5 identifies which of the face rectangles stored in the face rectangle sets 506 and 508 are false positives for the current frame pair. Upon finding a false positive, the example static false positive eliminator 512 of FIG. 5 removes the corresponding face rectangle from the example face data tracker 504. As a result, the frame pairs stored in the face data tracker 504 include a more accurate representation of the audience 106 in the media exposure environment 100 of FIG. 1. As a result, people counts generated using the information of the example face data tracker 504 are more accurate.

Figure 7:
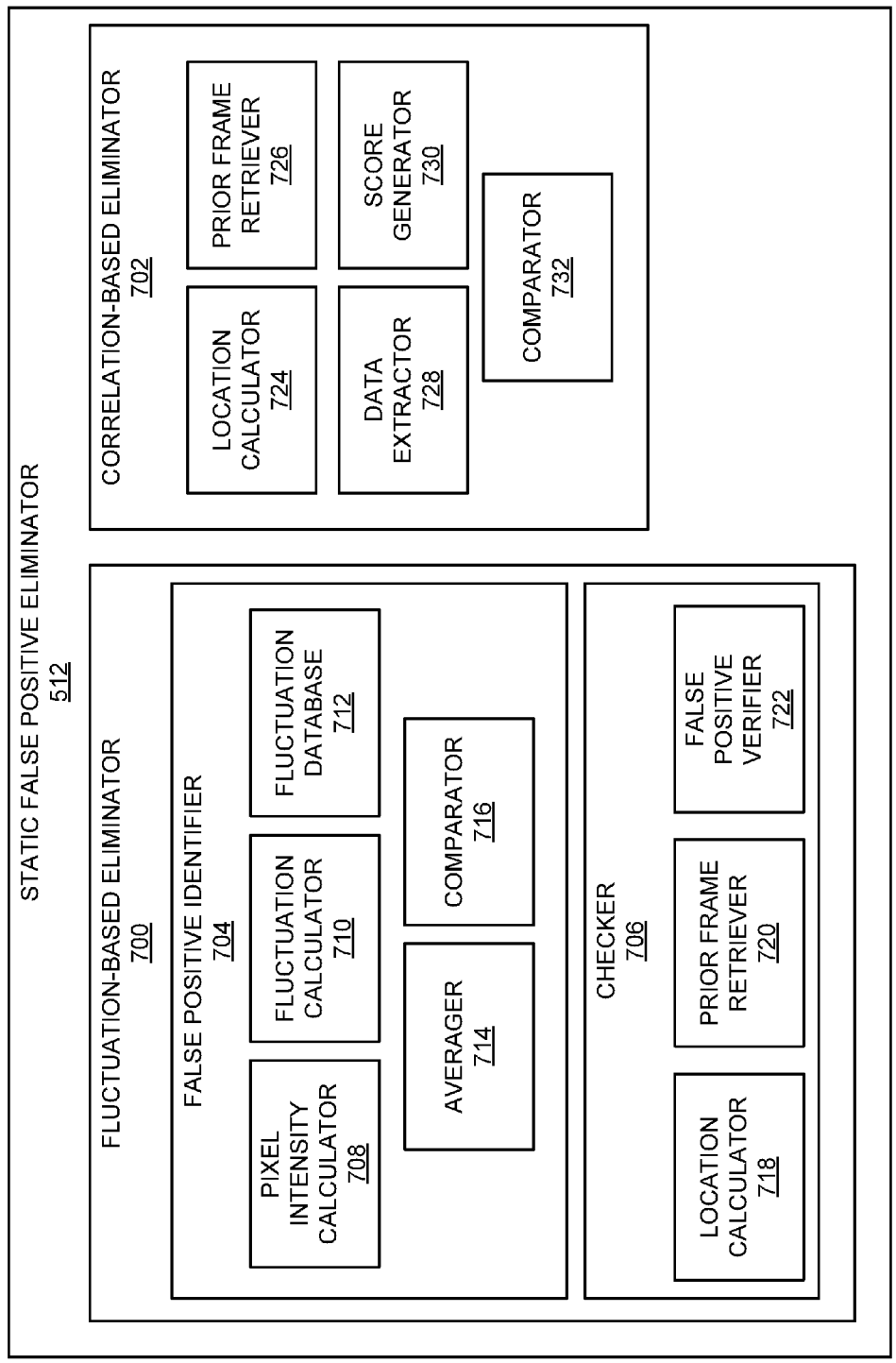
FIG. 7 is a block diagram of an example implementation of the example static false positive eliminator of FIG. 5.

FIG. 7 illustrates an example implementation of the static false positive eliminator 512 of FIG. 5. The example static false positive eliminator 512 of FIG. 7 includes a fluctuation-based eliminator 700 and a correlation-based eliminator 702. In the illustrated example of FIG. 7, both the fluctuation-based eliminator 700 and the correlation-based eliminator 702 are used to eliminate false positives from the face rectangle sets 506 and 508 of FIG. 5. In some examples, only one of the fluctuation-based eliminator 700 and the correlation-based eliminator 702 is used to eliminate false positives from the frame pair.

The example fluctuation-based eliminator 700 of FIG. 7 includes a false positive identifier 704 and a checker 706. In the illustrated example of FIG. 7, the false positive identifier 704 analyzes image data to identify one or more potential false positives and the checker 706 determines whether the potential false positive(s) correspond to previously identified face(s) and, thus, are not false positives. In other words, the example checker 706 determines whether any of the potential false positives identified by the example false positive identifier 704 are actually true positives based on data associated with previously captured image data. However, in some examples, the false positive identifier 704 may operate without the checker 706 verifying results of operations performed by the false positive identifier 704.

The example false positive identifier 704 of FIG. 7 takes advantage of fluctuations typically seen in image data associated with a human. Static objects (e.g., items that may be falsely identified as human faces, such as a picture of a human face) exhibit much lower pixel fluctuation than a live human face. To take advantage of this difference, the example false positive identifier 704 compares pixel intensity fluctuation of the face rectangles detected by the face detector 502 of FIG. 5 with other portions of the image data (most of which likely corresponds to static objects, such as furniture, floors, walls, etc.). In other words, the example false positive identifier 704 of FIG. 7 determines whether the face rectangle(s) detected by the face detector 502 of FIG. 5 include image data that fluctuates (e.g., in pixel intensity) more or less than image data corresponding to static objects.

The example false positive identifier 704 of FIG. 7 includes a pixel intensity calculator 708 that calculates an intensity value of each pixel of a current frame of image data (e.g., the first frame of the current frame pair captured by the first image sensor 404 or the second frame of the current frame pair captured by the second image sensor 405). The example false positive identifier 704 includes a fluctuation calculator 710 that incorporates the calculated pixel intensity for each pixel into a running fluctuation value associated with each pixel that is stored in a fluctuation database 712. That is, the fluctuation database 712 tracks a fluctuation value, as calculated by the fluctuation calculator 710, of each pixel captured by the corresponding image sensor. In the illustrated example of FIG. 7, the fluctuation values calculated by the fluctuation calculator 710 and stored in the fluctuation database 712 are root mean square (RMS) values. However, additional or alternative types of fluctuation values can be utilized by the example false positive identifier 704. The RMS values stored in the fluctuation database 712 represent the fluctuation of intensity of each pixel over a period of time, such as the previous five minutes.

Thus, each pixel of a current frame (or frame pair) has an RMS value stored in the fluctuation database 712. To utilize this information, the example false positive identifier 704 of FIG. 7 includes an averager 714 and a comparator 716. In the example of FIG. 7, the averager 714 calculates an average RMS value of a random set of pixels for the current frame. The example averager 714 generates the random set of pixels using a random number generator. Because most of the pixels in the image data are likely representative of static objects that do not have large intensity fluctuations, the average RMS value of the random set of pixels mainly represents the fluctuation of static objects (e.g., which may occur due to, for example, lighting changes, shadows, etc.). The example averager 714 of FIG. 7 also calculates an average RMS value for the pixels of each detected face rectangle for the current frame (e.g., from one of the face rectangle sets 506 or 508). The average RMS value of each face rectangle represents the intensity fluctuation across that face rectangle, which may include a human face (e.g., according to the face detector 502 of FIG. 5). For each face rectangle detected in the current frame, the example comparator 716 compares the average RMS value of the random set of pixels across the current frame to the average RMS of the respective face rectangle. If the respective face rectangle has an average RMS value less than or equal to the average RMS value of the random set of pixels, that face rectangle is determined to be a false positive (e.g., because the face rectangle fluctuates similar to static objects). If the respective face rectangle has an average RMS value greater than the average RMS value of the random set of pixels, that face rectangle is determined to be a true positive.

The example checker 706 of FIG. 7 receives the face rectangles that have been designated by the false positive identifier 704 as false positives and determines whether any of those face rectangles have previously (e.g., in connection with a previous frame or set of frames) been verified as corresponding to a human face. The example checker 706 of FIG. 7 includes a location calculator 718 to determine coordinates at which a received false positive face rectangle is located. In the illustrated example, the location calculator 718 retrieves the location data from the face data tracker 504 which, as described above, receives location data in association with the detected face rectangles from the face detector 502. The example checker 706 of FIG. 7 also includes a prior frame retriever 720 that retrieves data from the frame database 510 of FIG. 5 using the coordinates of the received false positive face rectangle. The example frame database 510 of FIG. 5 includes historical data indicative of successful face detections and the locations (e.g., coordinates) of the successful face detections. The example prior frame retriever 720 queries the frame database 510 with the coordinates of the received false positive face rectangle to determine whether a face was detected at that location in a previous frame within a threshold amount of time (e.g., within the previous twelve frames). If the query performed by the prior frame retriever 720 does not return a frame in which a face was successfully detected at the location in the previous frame(s), a false positive verifier 722 of the example checker 706 verifies that the received face rectangle is a false positive. If the query performed by the prior frame retriever 720 returns a frame in which a face was successfully detected at the location in the previous frame(s), the false positive verifier 722 designates the received face rectangle as a true positive. That is, if the checker 706 determines that a face was recently detected at the location of a received false positive, the example checker 706 of FIG. 7 disqualifies that face rectangle as a false positive and, instead, designates the face rectangle as a true positive. The corresponding face rectangle set 506 or 508 of the example face data tracker 504 of FIG. 5 is updated accordingly.

To provide an alternative or supplemental elimination of false positives, the example static false positive eliminator 512 of FIG. 7 includes the correlation-based eliminator 702. The example correlation-based eliminator 702 uses a comparison between a current frame and historical frame data to determine whether one or more of the face rectangles of the sets of face rectangles 506 and/or 508 are static false positives (e.g., include a static object rather than a human face). Similar to the example checker 706 described above, the example correlation-based eliminator 702 of FIG. 7 includes a location calculator 724 and a prior frame retriever 726. The example location calculator 724 of the correlation-based eliminator 702 determines coordinates of a detected face rectangle by, for example, accessing the location information stored in connection with the current frame in the face data tracker 504 of FIG. 5. The example prior frame retriever 726 of the correlation-based eliminator 702 retrieves a previous frame from the frame database 510 of FIG. 5. In the illustrated example, the example prior frame retriever 726 retrieves a frame that occurred sixty-three frames prior to the current frame from the frame database 510, which corresponds to approximately one hundred twenty-eight seconds. However, the prior frame retriever 726 can use alternative separation between the current frame and the previous frame. The example correlation-based eliminator 702 also includes a data extractor 728 to extract image data from the current frame and the retrieved previous frame. The example data extractor 728 of FIG. 7 extracts image data from the current frame and the retrieved previous frame at the coordinates provided by the location calculator 724 corresponding to the face rectangle.

The example correlation-based eliminator 702 includes a score generator 730 to generate a correlation score representative of a similarity between the image data extracted from the received face rectangle and the image data extracted from the previous frame at the calculated location of the received face rectangle. The score generator 730 uses one or more algorithms and/or techniques to generate the correlation score accordingly to any suitable aspect of the image data such as, for example, pixel intensity. Thus, the example score generator 730 determines how similar the image data of the face rectangle is to image data of a previous frame at the same location as the face rectangle. Using the correlation score, the example correlation-based eliminator 702 determines whether the image data of the face rectangle has changed over time in a manner expectant of a human face. To make this determination, the example correlation-based eliminator 702 includes a comparator 732 to compare the correlation score generated by the example score generator 730 to a threshold, such as ninety-two percent. While the threshold used by the example comparator 732 of FIG. 7 is ninety-two percent, another threshold may likewise be appropriate. If the correlation score for the face rectangle meets or exceeds the threshold, the example comparator 732 determines that the face rectangle likely corresponds to a static object and, thus, is a false positive. If the correlation score for the face rectangle is less than the threshold, the example comparator 732 verifies that the face rectangle includes a human face. The corresponding face rectangle set 506 or 508 of the example face data tracker 504 of FIG. 5 is updated accordingly.

Referring to FIG. 5, the example people counter 406 includes a frame pair overlap eliminator 514 to avoid double counting of human faces in the overlap region 204 (FIG. 2) associated with the first and second image sensors 404 and 405. The example frame pair overlap eliminator 514 eliminates face rectangles detected in connection with the second image sensor 405 that may have already been counted as detected in connection with the first image sensor 404.

Figure 8:
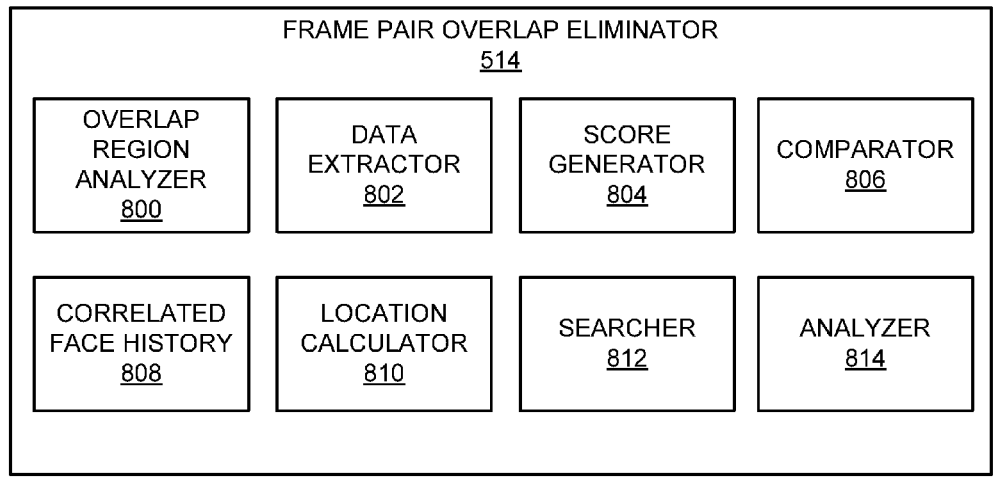
FIG. 8 is a block diagram of an example implementation of the example frame pair overlap eliminator of FIG. 5.

An example implementation of the example frame pair overlap eliminator 514 is illustrated in FIG. 8. The example frame pair overlap eliminator 514 of FIG. 8 includes an overlap region analyzer 800 to analyze a current frame pair to determine whether any of the face rectangles detected by the face detector 502 in connection with the second image sensor 405 fall in the overlap region 204 of FIG. 2. For example, the overlap region analyzer 800 obtains coordinates for each face rectangle detected in connection with the second image sensor 405 and determines whether the coordinates fall within borders of the overlap region 204. To obtain image data from the face rectangles associated with the second image sensor 405 that fall in the overlap region according to the overlap region analyzer 800, the example frame pair overlap eliminator 514 of FIG. 8 includes a data extractor 802. The example data extractor 802 extracts any suitable data, such as pixel intensity or average pixel intensity, that can be used to compare the detected overlap face rectangle associated with the second image sensor 405 to other image data (e.g., image data associated with the first image sensor 404).

The example data extractor 802 also extracts image data from each of the face rectangles detected in connection with the first image sensor 404. The example frame pair overlap eliminator 514 of FIG. 8 includes a score generator 804 to compare image data of a face rectangle identified by the face detector 502 in connection with the second image sensor 405 and identified by the overlap region analyzer 800 as falling in the overlap region 204 with each face rectangle identified by the face detector 502 in connection with the first image sensor 404. In other words, the example score generator 804 compares face rectangles detected in the overlap region 204 in connection with the second image sensor 405 to every face rectangle detected in connection with the first image sensor 405. The example score generator 804 of FIG. 8 generates a correlation score for each of these comparisons. Any factor(s) can be used for the comparisons such as, for example, pixel intensity, contrast, etc. A comparator 806 of the example frame pair overlap eliminator 514 compares the correlation score(s) to a threshold (e.g., ninety-two percent) to determine if the overlap face rectangle as sufficiently similar to one of the face rectangles detected in connection with the first image sensor 404. If the comparator 806 determines that the overlap face rectangle detected in connection with the second image sensor 405 is sufficiently similar to one of the face rectangles detected in connection with the first image sensor 404 (e.g., within the threshold), the comparator 806 designates the overlap rectangle detected in connection with the second image sensor 405 as a redundant face rectangle and eliminates the face rectangle from the second set of face rectangles 508 of the data tracker 504 of FIG. 5.

Further, the example frame pair overlap eliminator 514 maintains a correlated face history 808 (e.g., in a database) including face correlations identified by the comparator 806. That is, when a face rectangle detected in connection with the second image sensor 405 is determined to be redundant to a face rectangle detected in connection with the first image sensor 404, an entry is added to the correlated face history 808. As described below, the example correlated face history 808 enables an identification of a redundant face rectangle without having to extract and/or analyze image data of a face rectangle. Instead, the example correlated face history 808 provides the ability to identify a face rectangle detected in connection with the second image sensor 405 as redundant based solely on coordinates of the detected face rectangles of the corresponding frame.

Because the field of view of the first image sensor 404 is different from the field of view of the second image sensor 405, the coordinates of the redundant face rectangle detected in connection with the second image sensor 405 are different from the coordinates of the corresponding face rectangle detected in connection with the first image sensor 405. In other words, even though the face rectangles are determined to correspond to the same face (e.g., by the comparator 806), the respective coordinates for each image sensor are different from the other. To determine a location of each face rectangle, the example frame pair overlap eliminator 514 includes a location calculator 810. The example location calculator 810 of FIG. 8 determines first coordinates for the face rectangle detected in connection with the first image sensor 404 and second coordinates for the overlap face rectangle detected in connection with the second image sensor 405 (the face rectangle determined to be redundant). The first and second coordinates are linked together and stored in the correlated face history 808 as corresponding to a redundant pair of face rectangles. Thus, the correlated face history 808 includes a plurality of entries, each corresponding to a pair of face rectangles determined to be redundant. Further, each entry of the correlated face history 808 includes first coordinates corresponding to the first image sensor 404 and second coordinates corresponding to the second image sensor 405. The first coordinates are referred to herein as first-camera coordinates and the second coordinates are referred to herein as second-camera coordinates.

The example frame pair overlap eliminator 514 includes a searcher 812 to query the correlated face history 808 such that a face rectangle detected in connection with the second image sensor 405 in a current frame pair can be identified as a redundancy based on its location and the presence of another face rectangle detected in connection with the first image sensor 404 at the counterpart location of the first frame. As described above, the example overlap region analyzer 800 determines coordinates of a face rectangle detected in connection with the second image sensor 405 in the overlap region for the current frame pair. The example searcher 812 uses the coordinates to query the correlated face history 808. The query is meant to determine if the correlated face history 808 includes an entry having second-camera coordinates matching the coordinates of the overlap face rectangle obtained by the overlap region analyzer 800. If so, that entry is analyzed by an analyzer 814 to obtain the first-camera coordinates linked to the found second-camera coordinates. The example analyzer 814 also analyzes the current frame pair to determine whether the first image sensor 404 detected a face rectangle at the first-camera coordinates obtained from the correlated face history 808. If so, the face rectangle detected in connection with the second image sensor 405 in the current frame is determined by the analyzer 814 to be a redundant face rectangle. That is, the analyzer 814 determines that the two face rectangles of the current frame pair have the same locations as a pair of face rectangles previously determined to be redundant and, thus, are also redundant. Face rectangles determined to be redundant by the example comparator 806 or the example analyzer 814 are eliminated from the second set of face rectangles 508 so that those face rectangles are not double counted in later analyses.

Referring to FIG. 5, the example static false positive eliminator 512 of FIGS. 5 and/or 7 and the example frame pair overlap eliminator 514 of FIGS. 5 and/or 8 eliminate redundant and/or overlapping face rectangles, respectively, from the first and/or second sets of face rectangles 506, 508. The example static false positive eliminator 512 and the example frame pair overlap eliminator 514 of FIG. 5 perform their operations on each frame pair as the frame pair is received at the example people counter 406 of FIG. 5.

As described above, the example interval tracker 500 determines when a threshold amount of frame pairs have been received at the people counter 406 to trigger a calculation of a people tally for a corresponding period of time. For example, the interval tracker 500 may determine that thirty frame pairs have been received at the people counter 406 and processed by the static false positive eliminator 512 and/or the frame pair overlap eliminator 514. In response, the example interval tracker 500 triggers a grouper 516 to initiate a calculation of a people tally for the thirty frame pairs. As part of the triggering, the example interval tracker 500 provides the conditioned sets of rectangles 506 and 508 to the grouper 516 and resets or clears the face rectangle sets 506 and 508 so that data can be stored in the sets 506 and 508 for the succeeding time interval. The information of the sets 506 and 508 may be stored or backed up in the frame database 510 before being reset. In some examples, running averages are used, so a reset is not employed.

Figure 9:
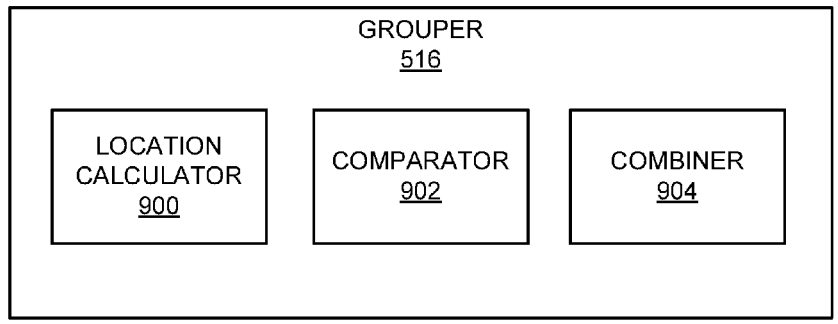
FIG. 9 is a block diagram of an example implementation of the example grouper of FIG. 5.

An example implementation of the example grouper 516 is illustrated in FIG. 9. The example grouper 516 of FIG. 9 includes a location calculator 900 to obtain the location of the face rectangles of the sets 506 and 508. As described above, location information of the face rectangles (e.g., coordinates of a center of the corresponding detected face rectangle as shown in FIG. 3) is stored in the example face data tracker 504 and, thus, the example location calculator 900 retrieves the location information from the data tracker 504 in the illustrated example. The example grouper 516 of FIG. 9 also includes a comparator 902 to compare the retrieved locations of the face rectangles. The example comparator 902 determines whether any of the face rectangles of the sets 506, 508 collected over the period of time defined by the interval tracker 500 are similarly located within a threshold. In the illustrated example, the threshold is actually two thresholds, namely a vertical threshold or range corresponding to a Y-coordinate of the location information and a horizontal threshold or range corresponding to an X-coordinate of the location information. If two or more face rectangles of the sets 506 and 508 have locations corresponding to the vertical and horizontal thresholds, a combiner 904 of the grouper 516 groups the similarly located face rectangles together to form a group.

After the face rectangles 506, 508 received by the grouper 516 in connection with the current time interval are analyzed, the example combiner 904 of FIG. 9 determines whether any of the formed groups have less than a threshold amount of member face rectangles. For example, the combiner 904 may determine whether any of the formed groups have less than five face rectangles. If a group has less than the threshold amount of members, the example combiner 904 disqualifies that group as not including enough face detections to be reliable. A group having less than the threshold amount of members over the period of time defined by the interval tracker 500 likely corresponds to transient detections of faces and/or includes false positives that survived the conditioning provided by the example static false positive eliminator 512 of FIG. 5. In the illustrated example, for each group having the requisite amount (e.g., more than the threshold) of members, the combiner 904 generates a list of face rectangles belonging to the group and/or assigns an identifier to face rectangles belonging to the group.

Referring to FIG. 5, the example people counter 406 includes a group overlap eliminator 518 to eliminate redundant groups. While the frame pair overlap eliminator 514 attempts to eliminate all redundant face rectangles from individual frame pairs, redundant face rectangles may survive the conditioning provided by the frame pair overlap eliminator 514. For example, redundant face rectangles not occurring in the same frame pair are not eliminated by the example frame pair overlap eliminator 514. Accordingly, the example group overlap eliminator 518 analyzes the groups provided by the grouper 516 for redundant groups.

Figure 10:
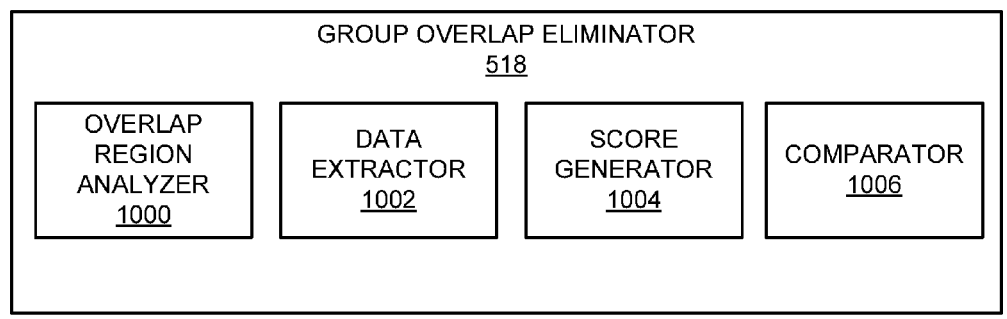
FIG. 10 is a block diagram of an example implementation of the example group overlap eliminator of FIG. 5.

An example implementation of the group overlap eliminator 518 is illustrated in FIG. 10. The example group overlap eliminator 518 of FIG. 10 includes an overlap region analyzer 1000 to determine whether any of the groups provided by the grouper 516 corresponding to the second image sensor 405 are located in the overlap region 204. In the illustrated example, the overlap region analyzer 1000 obtains an average center of the face rectangles of each group and determines whether the average center falls within borders of the overlap region 204. To obtain image data from the face rectangles of any group(s) associated with the second image sensor 405 and falling in the overlap region 204, the example group overlap eliminator 518 of FIG. 10 includes a data extractor 1002. The example data extractor 1002 extracts any suitable data, such as pixel intensity or average pixel intensity, to be used to compare the face rectangles of the overlap group to other image data. The example data extractor 1002 also extracts image data from each of the face rectangles detected in connection with the first image sensor 404.

The example frame pair overlap eliminator 518 of FIG. 10 includes a score generator 1004 to compare image data of the overlap group associated with the second image sensor with each face rectangle identified by the face detector 502 in connection with the first image sensor 404. In other words, a face rectangle of a group detected in the overlap region 204 in connection with the second image sensor 405 is compared to every face rectangle detected in connection with the first image sensor 405. The example score generator 1004 of FIG. 10 generates a correlation score for each of these comparisons. A comparator 1006 of the example group overlap eliminator 518 compares the correlation score(s) to a threshold (e.g., ninety-two percent) to qualify the overlap group face rectangle as sufficiently similar to one of the face rectangles detected in connection with the first image sensor 404. If the comparator 1006 determines that the group overlap face rectangle detected in connection with the second image sensor 405 is sufficiently similar to one of the face rectangles detected in connection with the first image sensor 404, the comparator 1006 designates the overlap group detected in connection with the second image sensor 405 as redundant.

Referring to FIG. 5, the group overlap eliminator 518 provides the surviving groups to a group tally generator 520. In the illustrated example, the group tally generator 520 counts the number of groups provided by the group overlap eliminator 518 to form a people tally for the period of time defined by the interval tracker 500. The calculated people tally is provided to a discrepancy resolver 522, which is described in detail below.

The example people counter 406 also includes a blob tally generator 524 that also generates a people tally for the period of time defined by the interval tracker 500. The example blob tally generator 524 creates one or more blobs based on the sets of face rectangles 506 and 508 and count the blobs to develop a people tally for the period of time. As described below in connection with the discrepancy resolver 522, the people tally generated by the blob tally generator 524 can be used to verify or substitute for the people tally provided by the group tally generator 520 of FIG. 5.

Figure 11:
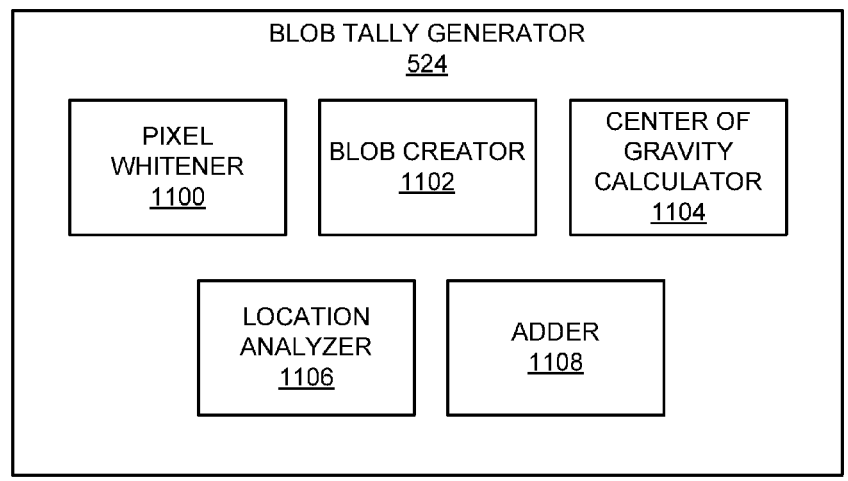
FIG. 11 is a block diagram of an example implementation of the example blob tally generator of FIG. 5.

An example implementation of the blob tally generator 524 is illustrated in FIG. 11. The example blob tally generator 524 of FIG. 11 includes a pixel whitener 1100 to whiten each pixel of the face rectangles 506 and 508. Additionally, the example pixel whitener 1100 of FIG. 11 blackens each pixel not corresponding to a detected face. The blob tally generator 524 also includes a blob creator 1102 to use the whitened/blackened pixel data to form a blob image. In particular, the blob creator 1102 combines or overlays the whitened/blackened image data spanning across the period of time defined by the interval tracker 500. The whitened pixels of the combined image data is likely to correspond to a human face. That is, each blob of the blob image is counted by incrementing the people tally.

However, because the example people counter 406 of FIG. 5 counts people using multiple image sensors, some blobs provided by the blob creator 1102 may be double counted. To eliminate redundant blobs associated with the second image sensor 405, the example blob tally generator 524 includes a center of gravity calculator 1104 to identify a center of blobs provided by the blob creator 1102 connected to the second set of face rectangles 508 and, thus, the second image sensor 405. In particular, the example center of gravity calculator 1104 calculates a median vertical position and a median horizontal position of a blob. Other techniques of calculating the center of gravity of a blob are possible. The example blob tally generator 524 of FIG. 11 includes a location analyzer 1106 to determine whether the calculated center of gravity for a blob associated with the second image sensor 405 falls within boundaries of the overlap region 204. If the center of gravity of the blob falls within the boundaries of the overlap region 204, the blob is eliminated from the blob image formed by the blob creator 1102. An adder 1108 of the example blob tally generator 524 counts the surviving blobs to form a blob people tally.

In the illustrated example of FIG. 5, the generated blob people tally is provided to the discrepancy resolver 522. The example discrepancy resolver 522 also receives a group people tally from the group tally generator 520. If the discrepancy resolver 522 compares the two received tallies and determines that the tallies are the same, the discrepancy resolver 522 stores the people tally as a found people tally in a tally database 526 in connection with an identifier for the corresponding period of time, the length of which is defined by the interval tracker 500. Additionally, when there is no difference between the two tallies provided to the discrepancy resolver 522, the corresponding data stored in tally database 526 also includes an indication that both the group people tally and the blob people tally included the same number for that period of time. Therefore, the example tally database 526 of FIG. 5 includes a plurality of people tallies, each representative of a number of people in the media exposure environment 100 of FIG. 1 corresponding to a period of time.

When the people tally generated by the group tally generator 520 for a first period of time is different from the blob people tally generated by the blob tally generator 524 for the same first period of time, the example discrepancy resolver 522 of FIG. 5 analyzes entries of the tally database 526 corresponding to other periods of time near the first period of time. In particular, the example discrepancy resolver 522 of FIG. 5 determines the people tally stored in the tally database 526 for a certain amount of preceding periods of time. For example, when the first period of time is a minute beginning at 1:30 a.m., the discrepancy resolver 522 obtains the people tallies stored in the tally database 526 for 1:29 a.m., 1:28 a.m., and 1:27 a.m. The example discrepancy resolver 522 of FIG. 5 uses the data associated with preceding periods of time to choose one of the differing first and second tallies as the found people tally for the first period of time. In the illustrated example, the discrepancy resolver 522 chooses whichever of the differing first and second tallies matches an average tally of the preceding tallies. If no such match exists, the example discrepancy resolver 522 selects whichever of the differing first and second tallies is closest to the average tally of the preceding tallies. The example discrepancy resolver 522 of FIG. 5 can utilize the data of the tally database 526 for the preceding periods of time in additional or alternative manners to resolve the discrepancy between the group tally generator 520 and the blob tally generator 524.

While an example manner of implementing the people counter 406 of FIG. 2 has been illustrated in FIGS. 5-11, one or more of the elements, processes and/or devices illustrated in FIGS. 5-11 may be combined, divided, re-arranged, omitted, eliminated and/or implemented in any other way. Further, the example interval tracker 500, the example face detector 502, the example face data tracker 504, the example static false positive eliminator 512, the example frame pair overlap eliminator 514, the example grouper 516, the example group overlap eliminator 518, the example group tally generator 520, the example discrepancy resolver 522, the example blob tally generator 524, the example active region identifier 600, the example frame segmenter 604, the example fluctuation calculator 606, the example threshold calculator 610, the example comparator 612, the example segment linker 614, the example face detection logic 602, the example fluctuation-based eliminator 700, the example correlation-based eliminator 702, the example false positive identifier 704, the example checker 706, the example pixel intensity calculator 708, the example fluctuation calculator 710, the example averager 714, the example comparator 716, the example location calculator 718, the example prior frame retriever 720, the example false positive verifier 722, the example location calculator 724, the example prior frame retriever 726, the example data extractor 728, the example score generator 730, the example comparator 732, the example overlap region analyzer 800, the example data extractor 802, the example score generator 804, the example comparator 806, the example correlated face history 808, the example location calculator 810, the example searcher 812, the example analyzer 814, the example location calculator 900, the example comparator 902, the example combiner 904, the example overlap region analyzer 1000, the example data extractor 1002, the example score generator 1004, the example comparator 1006, the example pixel whitener 1100, the example blob creator 1102, the example center of gravity calculator 1104, the example location analyzer 1106, the example adder 1108, and/or, more generally, the example people counter 406 of FIGS. 5-11 may be implemented by hardware, software, firmware and/or any combination of hardware, software and/or firmware. Thus, for example, any of the example interval tracker 500, the example face detector 502, the example face data tracker 504, the example static false positive eliminator 512, the example frame pair overlap eliminator 514, the example grouper 516, the example group overlap eliminator 518, the example group tally generator 520, the example discrepancy resolver 522, the example blob tally generator 524, the example active region identifier 600, the example frame segmenter 604, the example fluctuation calculator 606, the example threshold calculator 610, the example comparator 612, the example segment linker 614, the example face detection logic 602, the example fluctuation-based eliminator 700, the example correlation-based eliminator 702, the example false positive identifier 704, the example checker 706, the example pixel intensity calculator 708, the example fluctuation calculator 710, the example averager 714, the example comparator 716, the example location calculator 718, the example prior frame retriever 720, the example false positive verifier 722, the example location calculator 724, the example prior frame retriever 726, the example data extractor 728, the example score generator 730, the example comparator 732, the example overlap region analyzer 800, the example data extractor 802, the example score generator 804, the example comparator 806, the example correlated face history 808, the example location calculator 810, the example searcher 812, the example analyzer 814, the example location calculator 900, the example comparator 902, the example combiner 904, the example overlap region analyzer 1000, the example data extractor 1002, the example score generator 1004, the example comparator 1006, the example pixel whitener 1100, the example blob creator 1102, the example center of gravity calculator 1104, the example location analyzer 1106, the example adder 1108, and/or, more generally, the example people counter 406 of FIGS. 5-11 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims of this patent are read to cover a purely software and/or firmware implementation, at least one of the example interval tracker 500, the example face detector 502, the example face data tracker 504, the example static false positive eliminator 512, the example frame pair overlap eliminator 514, the example grouper 516, the example group overlap eliminator 518, the example group tally generator 520, the example discrepancy resolver 522, the example blob tally generator 524, the example active region identifier 600, the example frame segmenter 604, the example fluctuation calculator 606, the example threshold calculator 610, the example comparator 612, the example segment linker 614, the example face detection logic 602, the example fluctuation-based eliminator 700, the example correlation-based eliminator 702, the example false positive identifier 704, the example checker 706, the example pixel intensity calculator 708, the example fluctuation calculator 710, the example averager 714, the example comparator 716, the example location calculator 718, the example prior frame retriever 720, the example false positive verifier 722, the example location calculator 724, the example prior frame retriever 726, the example data extractor 728, the example score generator 730, the example comparator 732, the example overlap region analyzer 800, the example data extractor 802, the example score generator 804, the example comparator 806, the example correlated face history 808, the example location calculator 810, the example searcher 812, the example analyzer 814, the example location calculator 900, the example comparator 902, the example combiner 904, the example overlap region analyzer 1000, the example data extractor 1002, the example score generator 1004, the example comparator 1006, the example pixel whitener 1100, the example blob creator 1102, the example center of gravity calculator 1104, the example location analyzer 1106, the example adder 1108, and/or, more generally, the example people counter 406 of FIGS. 5-11 are hereby expressly defined to include a tangible computer readable medium such as a memory, DVD, CD, Blu-ray, etc. storing the software and/or firmware. Further still, the example people counter 406 of FIGS. 5-11 may include one or more elements, processes and/or devices in addition to, or instead of, those illustrated in FIGS. 5-11, and/or may include more than one of any or all of the illustrated elements, processes and devices.

FIGS. 12-19 are flowcharts representative of example machine readable instructions for implementing the example people counter 406 of FIGS. 4-11. In the example flowcharts of FIGS. 12-19, the machine readable instructions comprise program(s) for execution by a processor such as the processor 2012 shown in the example computer 2000 discussed below in connection with FIG. 20. The program(s) may be embodied in software stored on a tangible computer readable medium such as a CD-ROM, a floppy disk, a hard drive, a digital versatile disk (DVD), a Blu-ray disk, or a memory associated with the processor 2012, but the entire program and/or parts thereof could alternatively be executed by a device other than the processor 2012 and/or embodied in firmware or dedicated hardware. Further, although the example program(s) is described with reference to the flowcharts illustrated in FIGS. 12-19, many other methods of implementing the example people counter 406 may alternatively be used. For example, the order of execution of the blocks may be changed, and/or some of the blocks described may be changed, eliminated, or combined.

As mentioned above, the example processes of FIGS. 12-19 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 12-19 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 12:
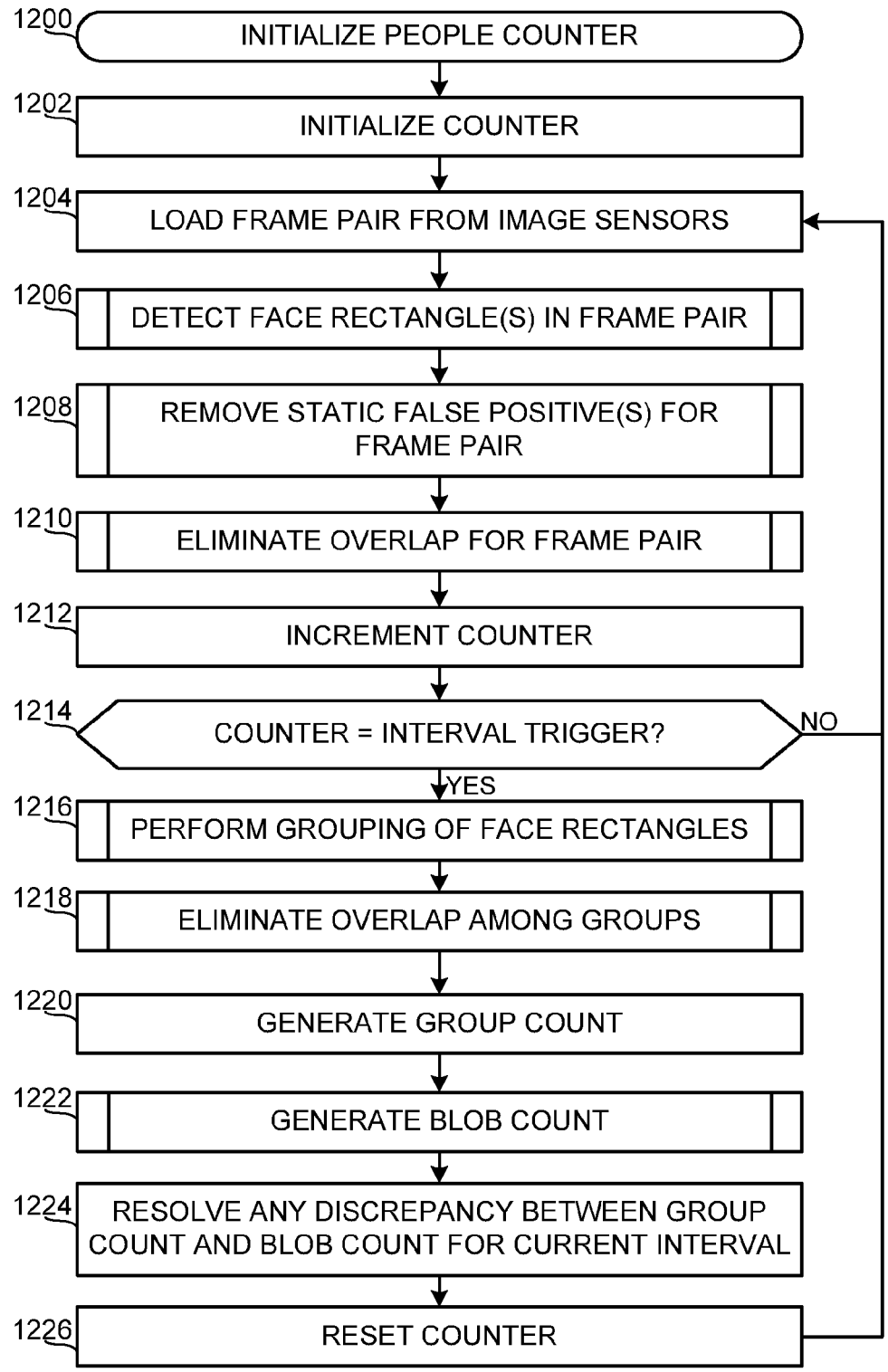
FIG. 12 is a flowchart representative of example machine readable instructions that may be executed to implement the example people counter of FIGS. 4 and/or 5.

The example of FIG. 12 begins with an initialization of the example people counter 406 of FIGS. 4 and/or 5-11 (block 1200). The interval tracker 500 (FIG. 5) is initialized to zero (block 1202) to begin tracking a period time for which the example people counter 406 is to generate a people tally representative of an amount of people located in the example media exposure environment 100 of FIG. 1. The first and second image sensors 404 and 405 provide the people counter 406 with a frame pair, which includes image data of the media exposure environment 100 (block 1204).

Figure 13:
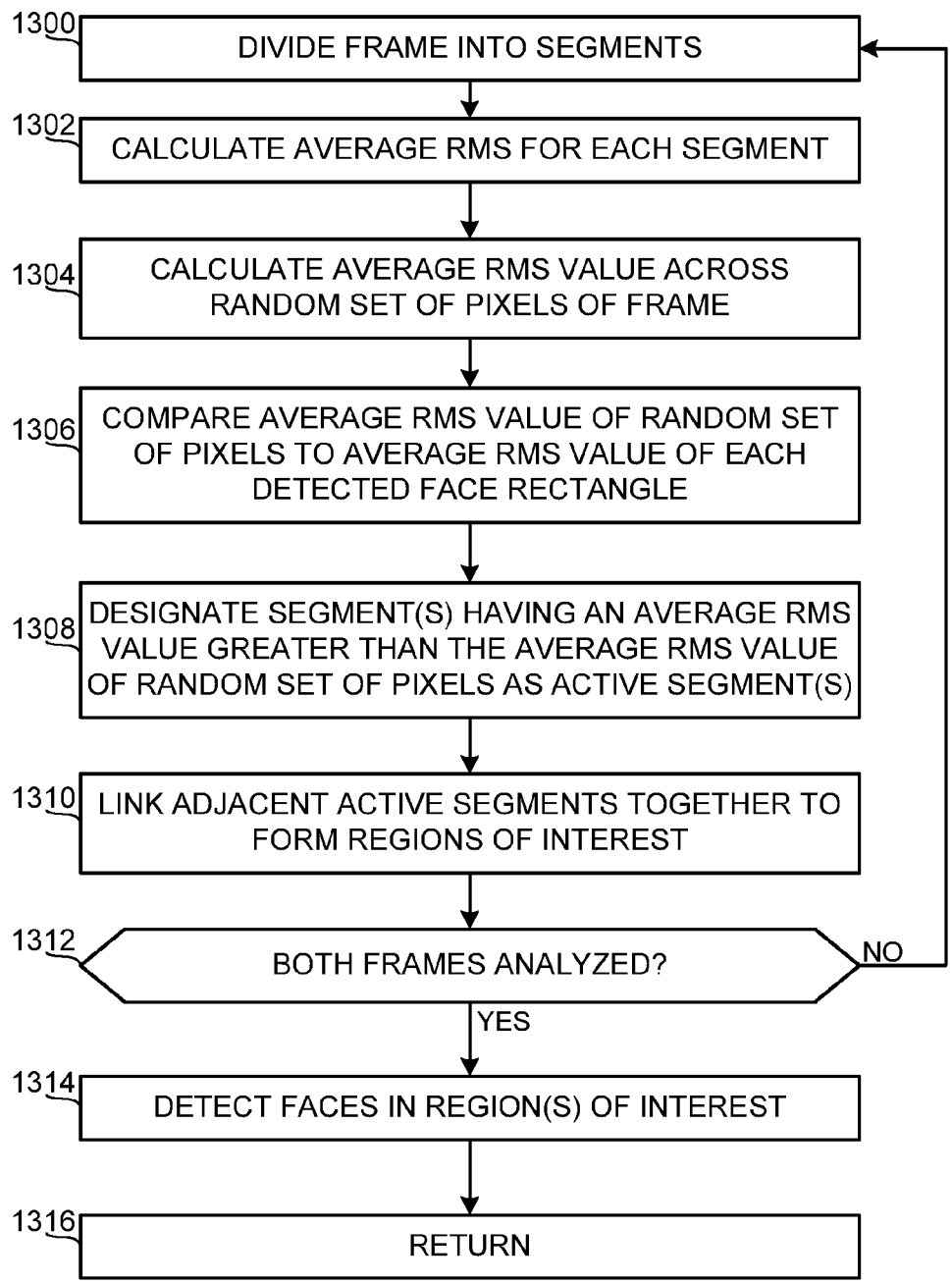
FIG. 13 is a flowchart representative of example machine readable instructions that may be executed to implement the example face detector of FIGS. 5 and/or 6.

The example face detector 502 executes a face detection operation that analyzes the image data to search for human faces (block 1206). An example implementation of block 1206 is shown in FIG. 13. The example of FIG. 13 begins with the frame segmenter 604 of the active region identifier 600 dividing a first frame of the frame pair (e.g., the frame captured by the first image sensor 404) into a plurality of segments (e.g., 50×50 pixel squares) (block 1300). The example fluctuation calculator 606 determines pixel intensities (or other image data characteristic(s)) of the segmented image and determines an average RMS for each segment (block 1302). As described above, the RMS for each segment is calculated based on the running RMS values for each pixel and/or segment in the fluctuation database 608. The RMS value for each segment with the current first frame incorporated therein is stored in the fluctuation database 608. The threshold calculator 610 calculates an average RMS for the current frame using a randomly selected set of pixel locations (block 1304). The average RMS is used as the threshold for the current frame. In particular, the comparator 612 compares the RMS value of each segment to the threshold (block 1306). The example comparator 612 designates segments having an RMS value greater than the threshold as active segments (block 1308). The segment linker 614 link the segments designated as active together to form one or more regions of interest (block 1310). The example active region identifier 600 identifies regions of interest for both frames of the current frame pair. Thus, if both frames have not been analyzed (block 1312), control returns to block 1300. Otherwise, the face detection logic 602 detects faces in the region(s) of interest formed at block 1310 (block 1314). Control returns to block 1208 of FIG. 12 (block 1316). When the face detector 502 detects a face, the face detector 502 also creates a face rectangle 300 (or any suitable shape) surrounding the detected face of a person 302. The face rectangle(s) generated by the example face detector 502 in connection with the first image sensor 404 are stored in the first set of face rectangles 506 and the face rectangle(s) generated by the example face detector 502 in connection with the second image sensor 405 are stored in the second set of face rectangles 508.

Figure 14A:
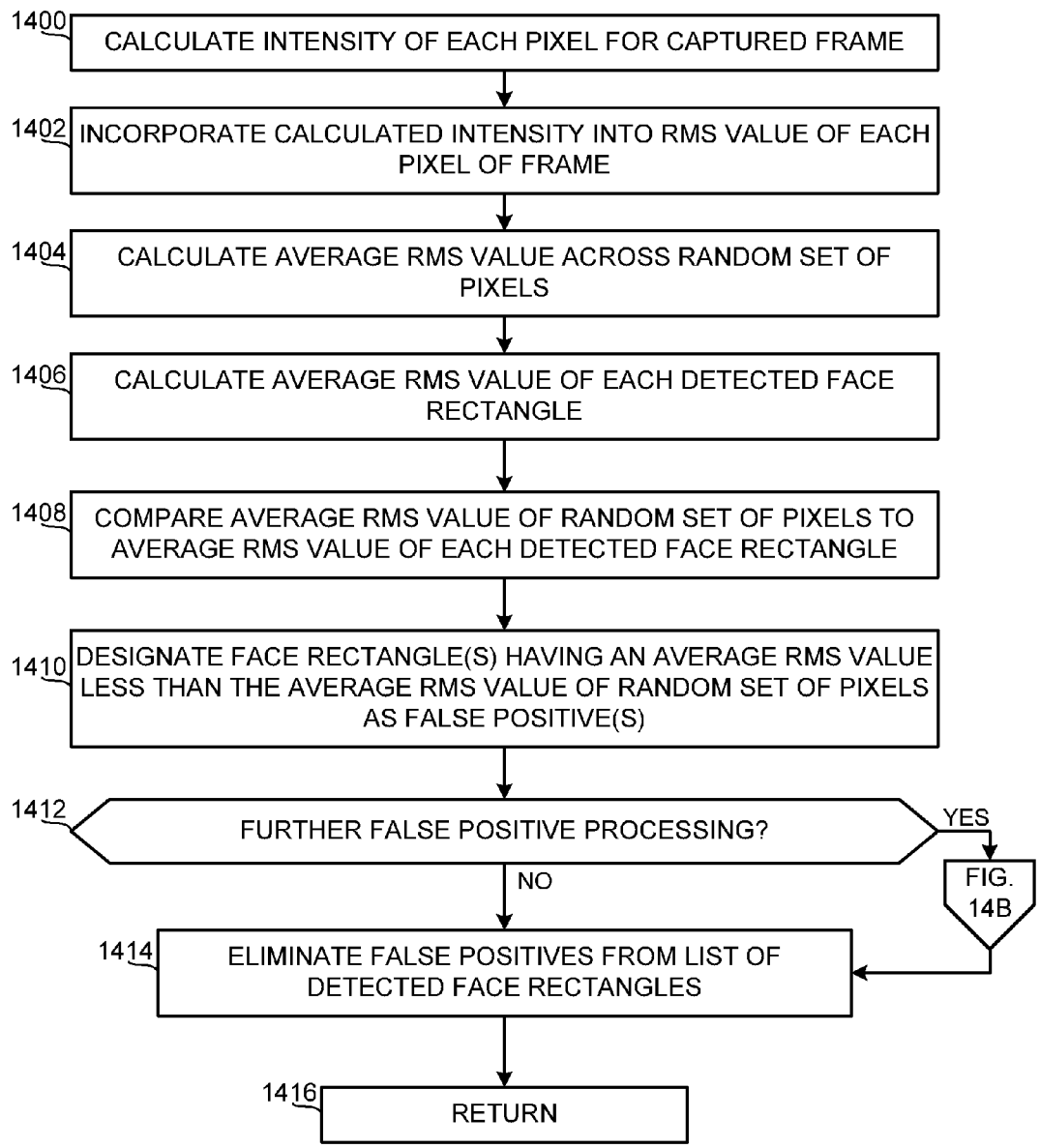
FIGS. 14A and 14B are flowcharts representative of example machine readable instructions that may be executed to implement the example static false positive eliminator of FIGS. 5 and/or 7.
Figure 14B:
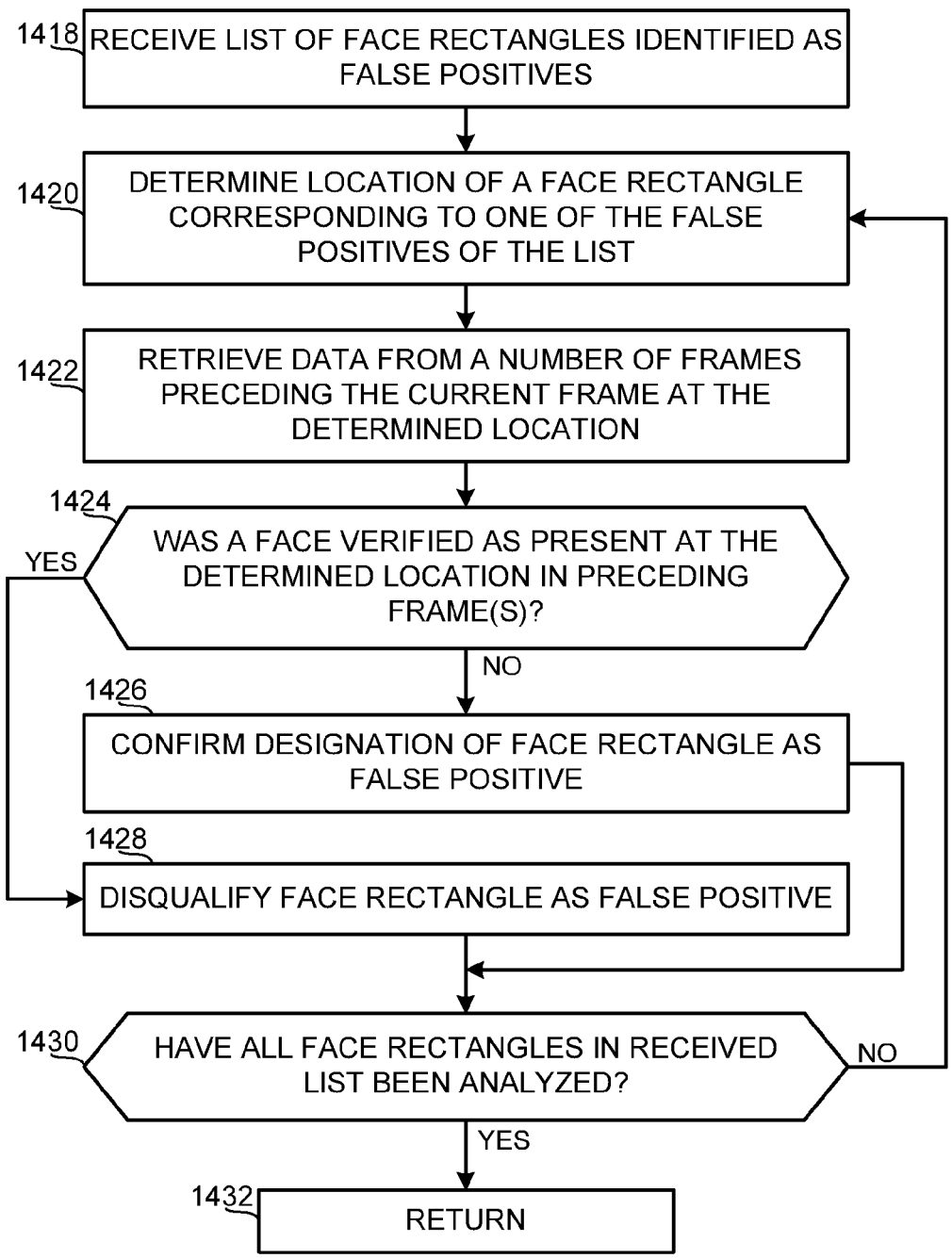

The example static false positive eliminator 512 removes false positives from the sets of face rectangles 506 and 508 (block 1208). An example implementation of block 1208 is shown in FIGS. 14A and 14B. The example of FIG. 14A corresponds to the example fluctuation-based eliminator 700 of FIG. 7. As described above, the example fluctuation-based eliminator 700 of FIG. 7 includes a false positive identifier 704 and a checker 706. In the example of FIG. 14A, the pixel intensity calculator 708 of the false positive identifier 704 calculates an intensity value of each pixel of a current frame of image data (block 1400). The calculated intensity values are incorporated into respective RMS values calculated by the example fluctuation calculator 710 (block 1402). The averager 714 averages RMS values of a random set of pixels for the current frame (block 1404). The example averager 714 also calculates an average RMS value for the pixels of each detected face rectangle for the current frame (block 1406). The example comparator 716 compares the average RMS value of the random set of pixels across the current frame to the average RMS of the respective face rectangle (block 1408). If a face rectangle has an average RMS value less than or equal to the average RMS value of the random set of pixels, that face rectangle is designated as a false positive (block 1410). As described above, the example checker 706 may supplement the detections of the false positive identifier 704. In the example of FIG. 14A, if the services of the checker 706 are desired or set to be executed (block 1412), control proceeds to FIG. 14B. Otherwise, the identified false positives are eliminated from the sets of face rectangles 506 and 508 (block 1414) and control returns to block 1210 of FIG. 12 (block 1416).

In the example of FIG. 14B, the example checker receives the face rectangles designated as false positives by the false positive identifier 704 (block 1418). The example location calculator 718 of the example checker 706 determines coordinates at which a received false positive face rectangle is located (block 1420). The prior frame retriever 720 retrieves data from the frame database 510 (FIG. 5) using the calculated location (block 1422). As described above, the example frame database 510 includes historical data indicative of successful face detections and the corresponding coordinates. If, according to the database 510, a face was not detected and/or verified as present at the calculated location in at that calculated location in previous frame(s) (block 1424), the false positive verifier 722 verifies that the received face rectangle is a false positive (block 1426). The previous frame(s) to be queried may be, for examples, frames captured within a threshold period of time previous to the current frame (e.g., the twelve prior frames). Otherwise, if a face was detected and/or verified at the calculated location in the previous frame(s) (block 1424), the false positive verifier 722 disqualifies the corresponding face rectangle as a false positive and, instead, marks the face rectangle as a true positive (block 1428). Control returns to block 1420 if all face rectangles from data received from the false positive identifier 704 have not been analyzed (block 1430). Otherwise, control returns to block 1210 of FIG. 12 (block 1432).

Figure 15:
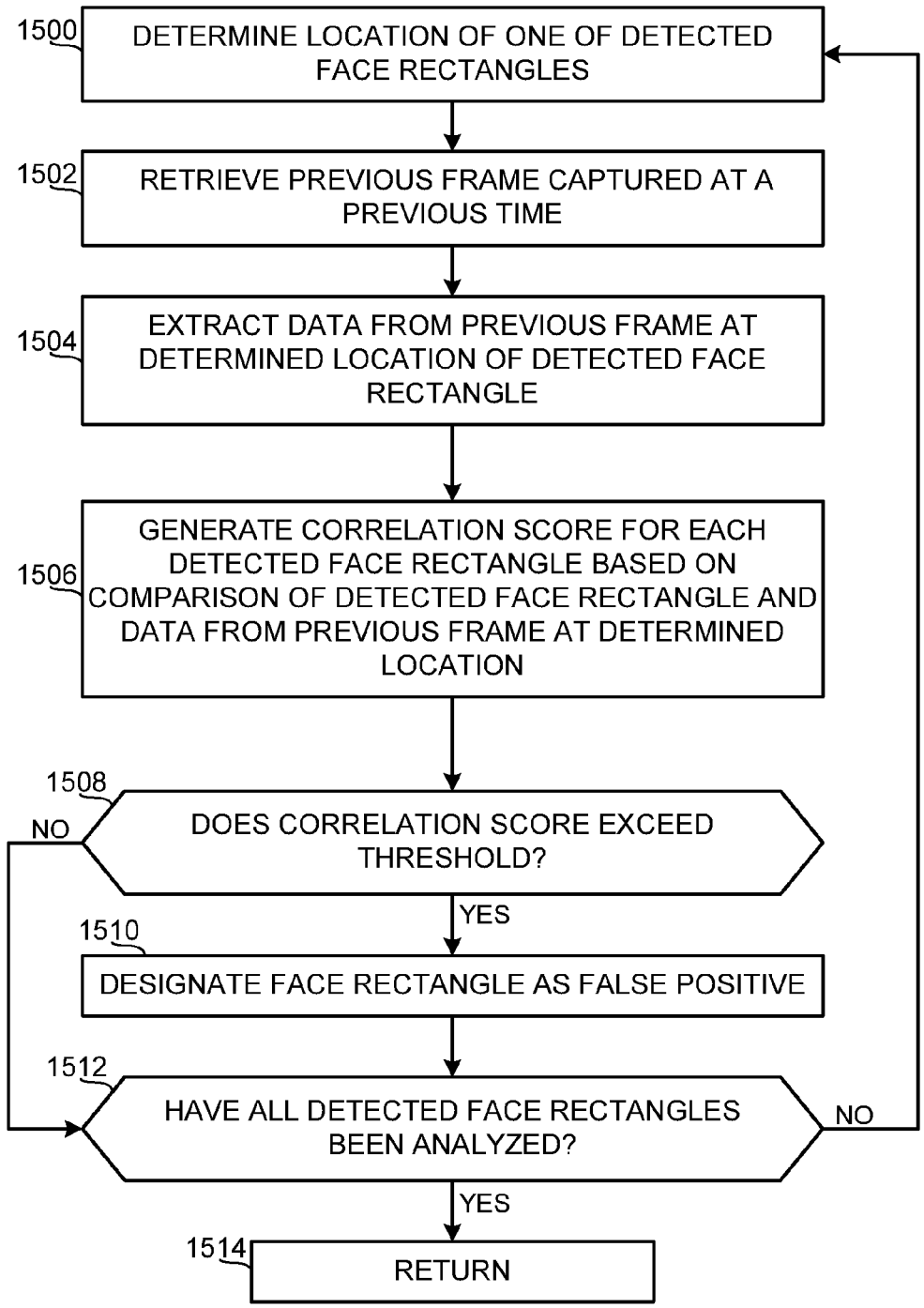
FIG. 15 is a flowchart representative of example machine readable instructions that may be executed to implement the example static false eliminator of FIGS. 5 and/or 7.

In addition to or in lieu of the examples described in FIGS. 14A and 14B, the example correlation-based eliminator 702 of FIG. 7 also eliminates false positives from the frame data. Another example implementation of block 1208 of FIG. 12 corresponding to the example correlation-based eliminator 702 is shown in FIG. 15. As described above, the example correlation-based eliminator 702 uses a comparison between a current frame and historical frame data to determine whether one or more of the face rectangles of the sets of face rectangles 506 and/or 508 are static false positives. The location calculator 724 of the example correlation-based eliminator 702 of FIG. 7 determines the coordinates of a detected face rectangle by, for example, accessing the location information stored in connection with the current frame in the face data tracker 504 (FIG. 5) (block 1500). The example prior frame retriever 726 retrieves a previous frame from the frame database 510 (block 1502). The example data extractor 728 of FIG. 7 extracts image data from the current frame and the retrieved previous frame at the coordinates provided by the location calculator 724 corresponding to the face rectangle (block 1504). The score generator 730 generates a correlation score representative of a similarity between the image data extracted from the received face rectangle and the image data extracted from the previous frame at the calculated location of the received face rectangle (block 1506). The comparator 732 determines whether the respective correlation score exceeds a threshold (block 1508). If so, the corresponding face rectangle is designated as a false positive and the corresponding set of face rectangles 506 or 508 is updated (block 1510). Otherwise, the example correlation-based eliminator 702 determines whether each face rectangle has been analyzed (block 1512). If not, control returns to block 1500. Otherwise, control returns to block 1210 of FIG. 12 (block 1514).

Figure 16:
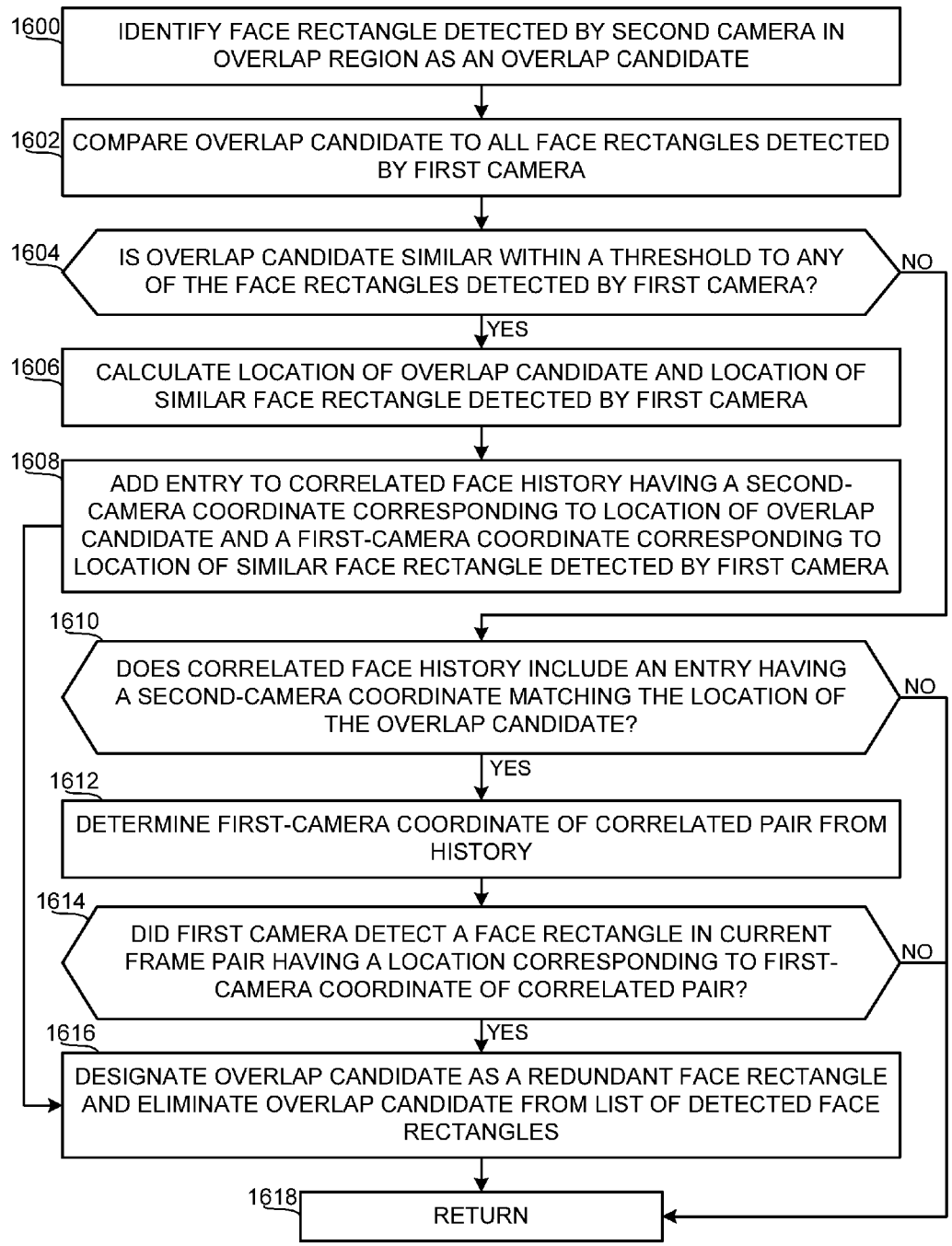
FIG. 16 is a flowchart representative of example machine readable instructions that may be executed to implement the example frame pair overlap eliminator of FIGS. 5 and/or 8.

Referring to FIG. 12, the example frame pair overlap eliminator 514 (FIG. 5) eliminates overlap from the current frame pair. An example implementation of block 1210 is illustrated in FIG. 16. In the example of FIG. 16, the overlap region analyzer 800 analyzes the overlap region 204 (FIG. 2) and identifies a face rectangle detected by the second image sensor 404 in the overlap region 204 (block 1600). Using the data extractor 802, the score generator 804, and the comparator 806 of the example frame pair overlap eliminator 514, the face rectangle detected in the overlap region 204 in connection with the second image sensor 405 is compared to the face rectangles detected in connection with the first image sensor 204 in the current frame pair (block 1602). If the face rectangle detected in the overlap region 204 is similar within a threshold to any of the face rectangles detected in connection with the first image sensor 404 (block 1604), the location of the face rectangle detected in the overlap region 204 (as detected by the overlap region analyzer 800) and the location of the matching face rectangle detected in connection with the first image sensor 404 are calculated (block 1606). Further, an entry is added to the correlated face history 808 including the calculated locations (block 1608).

Referring to block 1604, if the face rectangle detected in the overlap region 204 in connection with the second image sensor 405 is not similar within the threshold to any face rectangle detected in connection with the first image sensor 404, the searcher 812 queries the correlated face history 808 (block 1610). In particular, the searcher 812 determines whether the history 808 includes an entry having second-camera coordinates corresponding to the coordinates of the face rectangle detected in the overlap region 204 in connection with the second image sensor 405. If so, the corresponding first-camera coordinates of the matching history entry is determined (block 1612). If a face rectangle is detected in connection with the first image sensor 404 the current frame pair having a location corresponding to the first-camera coordinates obtained from the history 808 (block 1614), the analyzer 814 determines that the face rectangle detected in connection with the second image sensor 405 in the overlap region 204 in the current frame is redundant (block 1616). That is, the analyzer 814 determines that the two face rectangles of the current frame pair have the same locations as a pair of face rectangles previously determined to be redundant and, thus, are also redundant. Face rectangles determined to be redundant by the example comparator 806 or the example analyzer 814 are eliminated from the second set of face rectangles 508 so that those face rectangles are not double counted in later analyses (block 1616). Control returns to block 1212 of FIG. 12 (block 1618).

Figure 17:
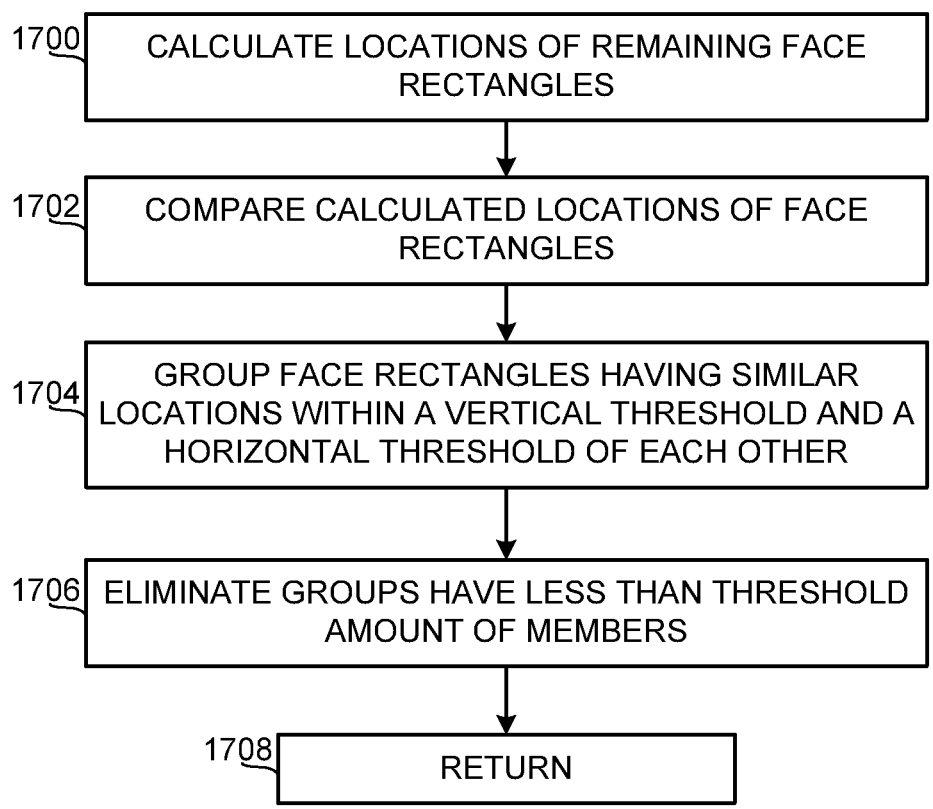
FIG. 17 is a flowchart representative of example machine readable instructions that may be executed to implement the example grouper of FIGS. 5 and/or 9.

Referring to FIG. 12, blocks 1208 and 120 have conditioned the data of the current frame pair loaded at block 1204 to remove static false positives and overlapping face rectangles. The interval tracker 500 increments the counter (block 1212). If the counter has not yet reached a threshold or trigger (block 1214), control returns to block 1204 and another frame pair is loaded. Otherwise, the example grouper 516 is triggered to execute on the face conditioned face rectangles of the sets 506 and 508 (block 1216). An example implementation of block 1216 is illustrated in FIG. 17. In the example of FIG. 17, the location calculator 900 of the example grouper 516 calculates or obtains the location of the face rectangles of the face data tracker 504 (e.g., the face rectangle sets 506 and 508), which includes the face rectangles surviving the elimination or conditioning processes of blocks 1208 and 1210 (block 1700). The example comparator 902 of the grouper 516 compares the calculated or obtained locations of the respective face rectangles (block 1702). In particular, the example comparator 902 determines whether any of the surviving face rectangles 506 collected over the defined time interval in connection with the first image sensor 404 have coordinates that are similar within a threshold. Further, the example comparator 902 determines whether any of the surviving face rectangles 508 collected over the defined time interval in connection with the second image sensor 405 have coordinates that are similar within a threshold. For each of the first and second sets of face rectangles 506 and 508, the combiner 904 groups similarly located face rectangles together to form a group (block 1704). Further, the combiner 904 eliminates any of the formed groups that have less than a threshold amount of members to eliminate, for example, transient face detections (block 1706). Control returns to block 1220 of FIG. 12 (block 1708).

Figure 18:
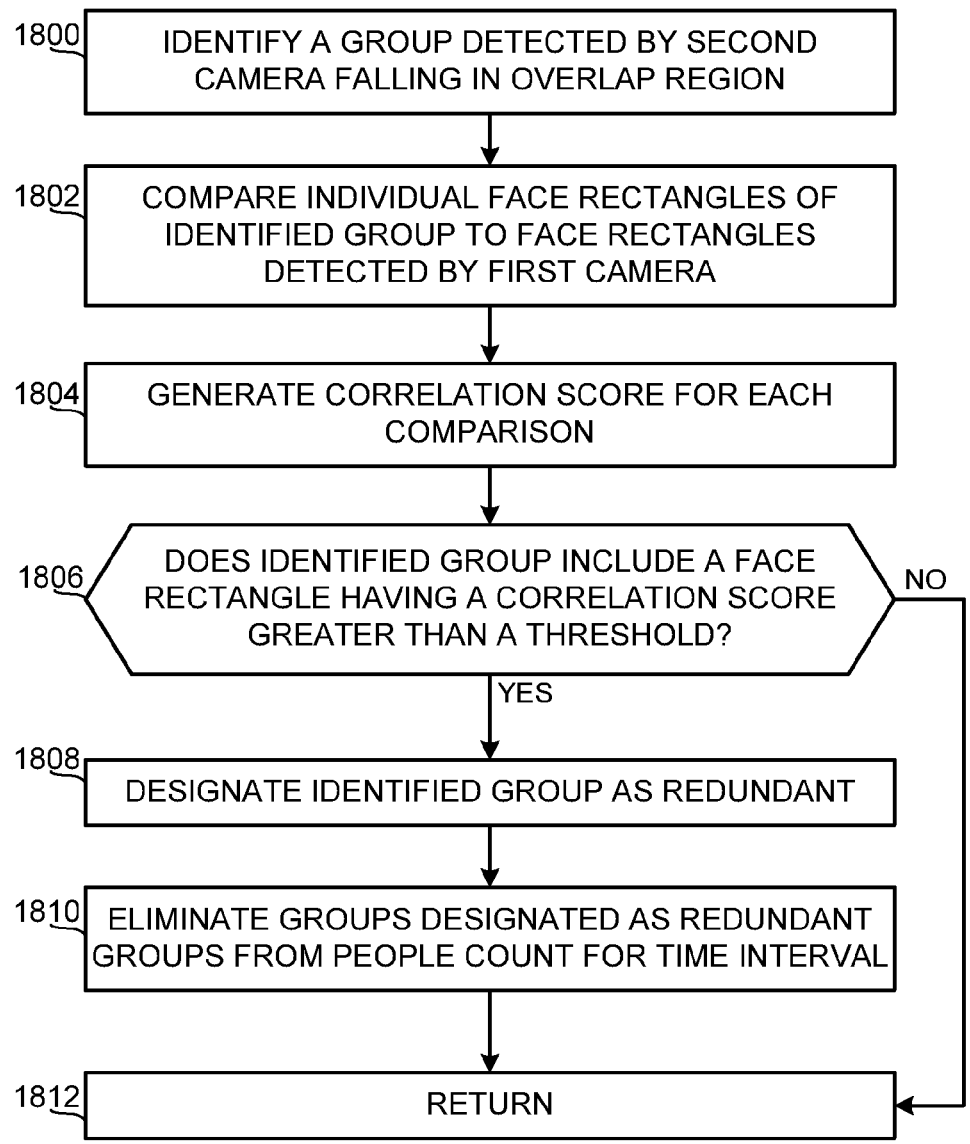
FIG. 18 is a flowchart representative of example machine readable instructions that may be executed to implement the example group overlap eliminator of FIGS. 5 and/or 10.

Referring to FIG. 12, the group overlap eliminator 518 eliminates overlap among the groups formed by the example grouper 516 (block 1218). An example implementation of block 1218 is illustrated in FIG. 18. In the example of FIG. 18, the overlap region analyzer 1000 of the example group overlap eliminator 518 identifies one of the group(s) formed by the grouper 516 in connection with the second image sensor 405 (block 1800). Image data of the face rectangles of the identified group are compared to image data of the face rectangles detected in connection with the first image sensor 404 (block 1802). For each of the comparisons, the score generator 1004 generates a correlation score (block 1804). If the group identified in block 1800 includes a face rectangle having a correlation score with the image data of the first image sensor 404 greater than a threshold according to the comparator 1006 (block 1806), the identified group is designated as a redundant group (block 1808). Further, the overlap group is eliminated from being counted in a people tally for the current time interval (block 1810). Control returns to block 1220 of FIG. 12 (block 1812).

Figure 19:
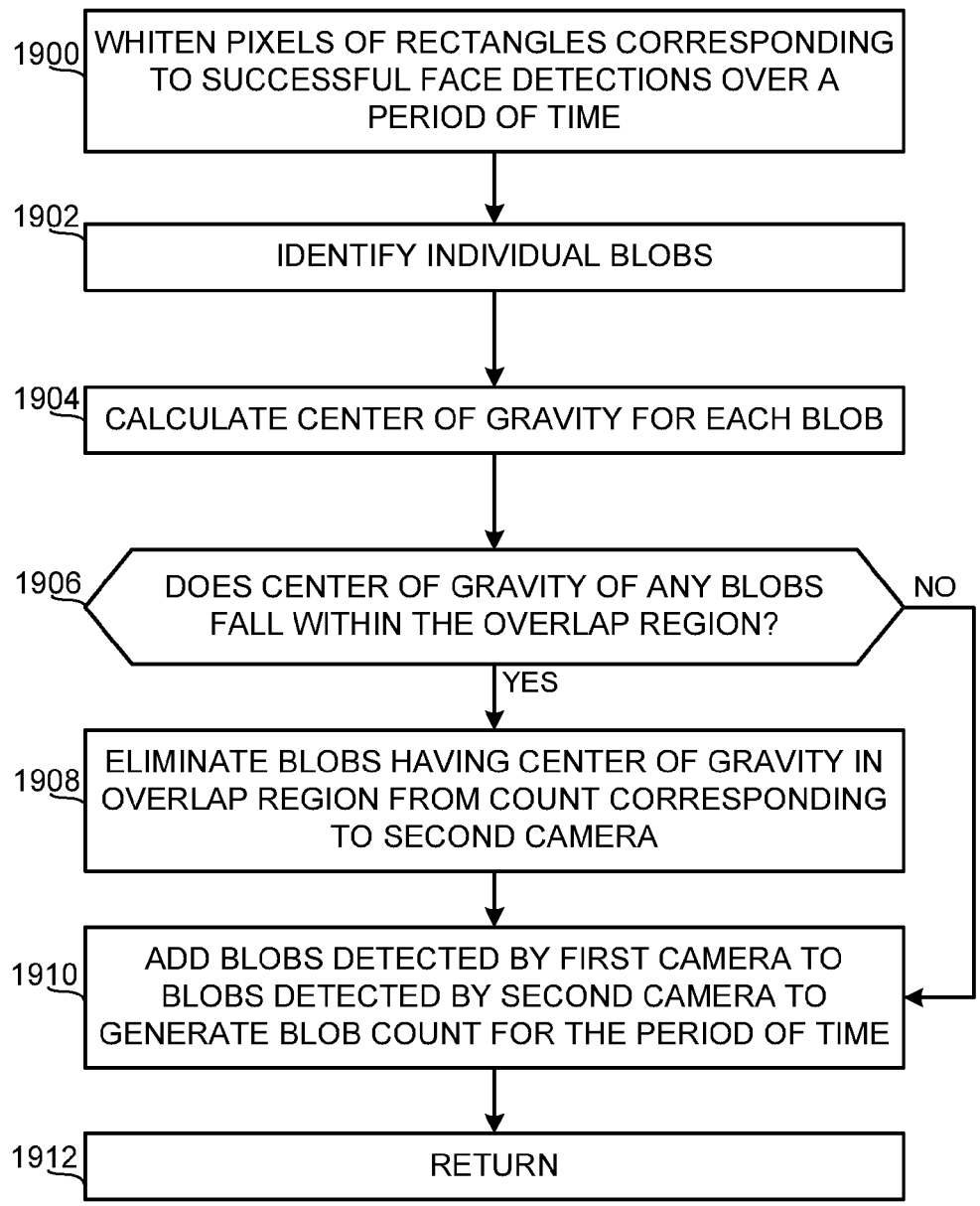
FIG. 19 is a flowchart representative of example machine readable instructions that may be executed to implement the example blob tally generator of FIGS. 5 and/or 11.

Referring to FIG. 12, the group overlap eliminator 518 provides the surviving groups to the group tally generator 520, which counts the number of surviving groups to form a people tally for the period of time defined by the interval tracker 500 (block 1220). In the illustrated example of FIG. 12, the example blob tally generator 524 also generates a people count for the period of time defined by the interval tracker 500 (block 1222). An example implementation of block 1222 is illustrated in FIG. 19. To generate the blob count for the defined period of time, the pixel whitener 1100 of the example blob tally generator 524 of FIG. 11 whitens each pixel of the detected face rectangles 506 and 508 of the face data tracker 504 (that survived the conditioning of blocks 1208 and 1210). Additionally, the example pixel whitener 1100 blackens each pixel not corresponding to a detected face. The blob creator 1102 uses the whitened/blackened pixel data to identify individual blobs that likely correspond to a person (block 1902). For example, the blob creator 1102 combines or overlays the whitened/blackened image data spanning across the period of time and combines the whitened pixels of the overlaid image to form a blob. To avoid double counting of redundant blobs, the center of gravity calculator 1104 calculates a center of the created blobs associated with the second set of face rectangles 508 and, thus, the second image sensor 405 (block 1904). The location analyzer 1106 determines whether the calculated center for a blob associated with the second image sensor 405 falls within boundaries of the overlap region 204 (block 1906). If so, the corresponding blob is eliminated from the blob image formed by the blob creator 1102 (block 1908). Otherwise, or after the redundant blobs are eliminated, the adder 1108 adds the surviving blobs together to form a blob people tally (block 1910). Control returns to block 1224 of FIG. 12 (block 1912).

Referring to FIG. 12, the group count generated at block 1220 and the blob count generated at block 1222 are reported to the discrepancy resolver 522, which resolves any discrepancy between the two counts (block 1224). As described above, if a discrepancy is found between the group count and the blob count for the period of time defined by the interval tracker 500, the discrepancy resolver 522 analyzes entries of the tally database 526 corresponding to previous periods of time proximate the current time interval. In the example of FIG. 12, the example discrepancy resolver 522 uses the data associated with preceding periods of time to choose one of the differing people counts. For example, the discrepancy resolver 522 chooses whichever of the group count and the blob count is closest (e.g., matches) an average people tally of the preceding time periods of the database 526. The people count selected by the discrepancy resolver 522 (or the common people count when no discrepancy exists between the group count and the blob count) is stored in the tally database 526. The counter of the interval tracker 500 is reset and control returns to block 1204 (block 1226).

While the example people counter 406 of FIGS. 2 and/or 3 is described in the context of an audience measurement device 104 and the generation of exposure data for media, the example methods, articles of manufacture, and apparatus disclosed herein can be applied to additional or alternative contexts, systems, measurements, applications, programs, etc. That is, the example methods, articles of manufacture, and apparatus disclosed herein can be used in any application to determine how many people are located in a space or location.

Figure 20:
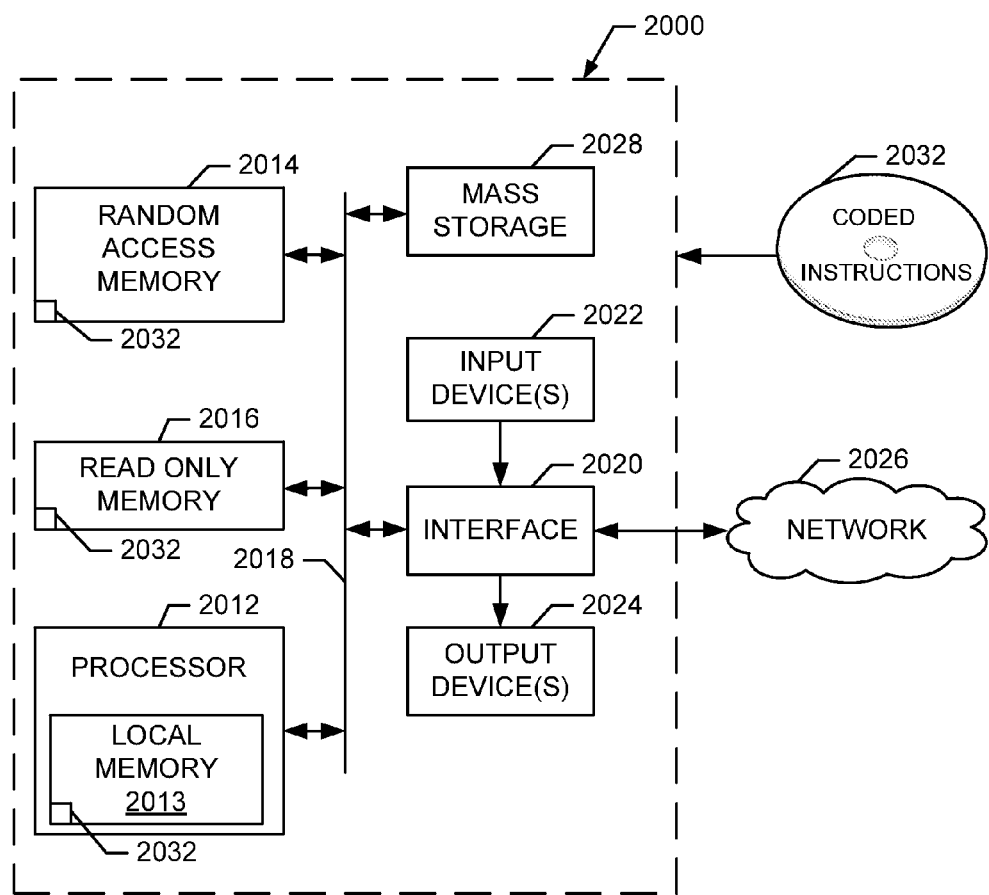
FIG. 20 is a block diagram of an example processing system capable of executing the example machine readable instructions of FIGS. 12-19 to implement the example people counter of FIGS. 4-11.

FIG. 20 is a block diagram of a processor platform 2000 capable of executing the instructions of FIGS. 12-19 to implement the people counter 406 of FIGS. 4-11. The processor platform 2000 can be, for example, a server, a personal computer, an Internet appliance, a DVD player, a CD player, a digital video recorder, a Blu-ray player, a gaming console, a personal video recorder, a set top box, or any other type of computing device.

The processor platform 2000 of the instant example includes a processor 2012. For example, the processor 2012 can be implemented by one or more microprocessors or controllers from any desired family or manufacturer.

The processor 2012 includes a local memory 2013 (e.g., a cache) and is in communication with a main memory including a volatile memory 2014 and a non-volatile memory 2016 via a bus 2018. The volatile memory 2014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2016 may be implemented by flash memory and/or any other desired type of memory device. Access to the main memory 2014, 2016 is controlled by a memory controller.

The processor platform 2000 also includes an interface circuit 2020. The interface circuit 2020 may be implemented by any type of interface standard, such as an Ethernet interface, a universal serial bus (USB), and/or a PCI express interface.

One or more input devices 2022 are connected to the interface circuit 2020. The input device(s) 2022 permit a user to enter data and commands into the processor 2012. The input device(s) can be implemented by, for example, a keyboard, a mouse, a touchscreen, a track-pad, a trackball, isopoint and/or a voice recognition system.

One or more output devices 2024 are also connected to the interface circuit 2020. The output devices 2024 can be implemented, for example, by display devices (e.g., a liquid crystal display, a cathode ray tube display (CRT), a printer and/or speakers). The interface circuit 2020, thus, typically includes a graphics driver card.

The interface circuit 2020 also includes a communication device such as a modem or network interface card to facilitate exchange of data with external computers via a network 2026 (e.g., an Ethernet connection, a digital subscriber line (DSL), a telephone line, coaxial cable, a cellular telephone system, etc.).

The processor platform 2000 also includes one or more mass storage devices 2028 for storing software and data. Examples of such mass storage devices 2028 include floppy disk drives, hard drive disks, compact disk drives and digital versatile disk (DVD) drives. The mass storage device 2028 may implement the frame database 510 and/or the fluctuation database 712.

The coded instructions 2032 of FIGS. 12-19 may be stored in the mass storage device 2028, in the volatile memory 2014, in the non-volatile memory 2016, and/or on a removable storage medium such as a CD or DVD.

In some example implementation, the example people counter 406 of FIGS. 4-111 is implemented in connection with an XBOX® gaming system. In some examples, the one or more sensors associated with the example people counter 406 of FIGS. 4-11 are implemented with KINECT® sensors (e.g., to capture images of an environment to count people). In some examples, some or all of the machine readable instructions of FIGS. 12-19 can be downloaded (e.g., via the Internet) to and stored on an XBOX® gaming console that implementing the example people counter 406 of FIGS. 4-11.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A method, comprising:
    Maintaining, with a processor, a history of instances in which a person is detected by a first image sensor and by a second sensor different than the first image sensor at approximately a same time, respective ones of the instances including:
        a first coordinate at which a first person was detected via the first image sensor; and
        a second coordinate at which the first person was detected via the second image sensor; and
    in response to first image data captured by the first image sensor including a second person at the first coordinate, determining, with a processor, whether second image data captured by the second image sensor includes the second person without comparing the first image data to the second image data; and
    eliminating, with the processor, the second person from a count of people.

2. The method as defined in claim 1, wherein the determining of whether the second image data includes the second person without comparing the first image data to the second image data includes determining whether a person indication is included at the second coordinate of the second image data.

3. The method as defined in claim 1, wherein the first coordinate corresponds to a location relative to the first image sensor, and the second coordinate corresponds to a same location relative to the second image sensor.

4. The method as defined in claim 1, wherein the first image data is captured at approximately a same time as the second image data.

5. The method as defined in claim 1, further including determining the first person detected via the first image sensor and the first person detected via the second image sensor at approximately the same time are a same person via image comparison.

6. The method as defined in claim 1, wherein the second person is detected in an overlap region corresponding to an intersection of a first field of view associated with the first image sensor and a second field of view associated with the second image sensor.

7. A tangible computer readable storage medium comprising instructions that, when executed, cause a machine to at least:
maintain a history of instances in which a person is detected by a first image sensor and by a second sensor different than the first image sensor at approximately a same time, respective ones of the instances including:
a first coordinate at which a first person was detected via the first image sensor; and
a second coordinate at which the first person was detected via the second image sensor; and
in response to first image data captured by the first image sensor including a second person at the first coordinate, determine whether second image data captured by the second image sensor includes the second person without comparing the first image data to the second image data; and
when the second image data includes the second person, eliminate the second person from a tally of people.

8. The tangible computer readable storage medium as defined in claim 7, wherein the instructions, when executed, cause the machine to, determine whether the second image data includes the second person without comparing the first image data to the second image data by determining whether a person indication is included at the second coordinate of the second image data.

9. The tangible computer readable storage medium as defined in claim 7, wherein the first coordinate corresponds to a location relative to the first image sensor, and the second coordinate corresponds to a same location relative to the second image sensor.

10. The tangible computer readable storage medium as defined in claim 7, wherein the first image data is captured at approximately a same time as the second image data.

11. The tangible computer readable storage medium as defined in claim 7, wherein the instructions cause the machine to perform image comparison to determine whether the first person detected via the first image sensor and the first person detected via the second image sensor at approximately the same time are a same person.

12. The tangible computer readable storage medium as defined in claim 7, wherein the second person is detected in an overlap region corresponding to an intersection of a first field of view associated with the first image sensor and a second field of view associated with the second image sensor.

13. An apparatus, comprising:
memory to store a history of instances in which a person is detected by a first image sensor and by a second sensor different than the first image sensor at approximately a same time, respective ones of the instances including:
a first coordinate at which a first person was detected via the first image sensor; and
a second coordinate at which the first person was detected via the second image sensor; and
an overlap eliminator to, in response to first image data captured by the first image sensor including a second person at the first coordinate, determine whether second image data captured by the second image sensor includes the second person without comparing the first image data to the second image data, and, the overlap eliminator is to eliminate the second person from a count of people.

14. The apparatus as defined in claim 13, wherein the overlap eliminator is to determine whether the second image data includes the second person indication without comparing the first image data to the second image data by determining whether a person indication is included at the second coordinate of the second image data.

15. The apparatus as defined in claim 13, wherein the first image data is captured at approximately a same time as the second image data.

16. The apparatus as defined in claim 13, wherein the first person detected via the first image sensor and the first person detected via the second image sensor at approximately the same time are determined to be a same person via image comparison.

17. The apparatus as defined in claim 13, wherein the second person is detected in an overlap region corresponding to an intersection of a first field of view associated with the first image sensor and a second field of view associated with the second image sensor.

* * * * *